United States Patent
Rozenson

(10) Patent No.: US 10,074,142 B1
(45) Date of Patent: Sep. 11, 2018

(54) COMPUTATIONAL ARCHITECTURE AND METHOD FOR A TIME-VARYING CONTROL SYSTEM

(71) Applicant: Algonyx LLC, Woodbury, MN (US)

(72) Inventor: Aleksandr Rozenson, Woodbury, MN (US)

(73) Assignee: Algonyx LLC, Woodbury, MN (US)

( * ) Notice: Subject to any disclaimer, the term of this patent is extended or adjusted under 35 U.S.C. 154(b) by 486 days.

(21) Appl. No.: 14/829,311

(22) Filed: Aug. 18, 2015

Related U.S. Application Data

(60) Provisional application No. 62/038,600, filed on Aug. 18, 2014.

(51) Int. Cl.
*G07B 17/00* (2006.01)
*G06Q 40/00* (2012.01)
*G06F 19/00* (2018.01)

(52) U.S. Cl.
CPC .................... *G06Q 40/12* (2013.12)

(58) Field of Classification Search
USPC ......................................................... 705/30
See application file for complete search history.

(56) References Cited

U.S. PATENT DOCUMENTS

| | | | |
|---|---|---|---|
| 5,953,707 A * | 9/1999 | Huang .................... | G06Q 10/06 705/7.25 |
| 5,991,525 A | 11/1999 | Shah et al. | |
| 6,032,121 A * | 2/2000 | Dietrich ................. | G06Q 10/06 701/23 |
| 6,611,726 B1 * | 8/2003 | Crosswhite ............. | G06F 17/18 700/100 |
| 6,738,682 B1 * | 5/2004 | Pasadyn ................. | G05B 13/04 700/100 |
| 6,757,579 B1 * | 6/2004 | Pasadyn ................. | G05B 13/04 700/108 |
| 6,965,867 B1 * | 11/2005 | Jameson ................. | G06Q 10/06 700/100 |

(Continued)

OTHER PUBLICATIONS

"Chapter 35", SAS/ETS 13.2 User Guide. The VARMAX Procedure, (2014), 2416-2603.

(Continued)

*Primary Examiner* — Ashford S Hayles
(74) *Attorney, Agent, or Firm* — Schwegman Lundberg & Woessner, P.A.

(57) ABSTRACT

Automatic control of an enterprise. A control vector is generated corresponding to a target allocation of resources between the plurality of products to be produced by the enterprise. An observation vector represents actual retained earnings attributed to each of the plurality of products during a first time period, the actual retained earnings being based on data representing the actual revenue and on data representing the actual cost. A dynamic matrix, a control matrix, a cost matrix, and an observation matrix are produced. Each matrix represents a corresponding dynamic relationship between a sets of different control parameters or measured or predicted values, and is revised at each subsequent time period to produce predicted values for each corresponding matrix. According to various embodiments, the revision can have two components: (a) vectorization; and (b) forecasting.

20 Claims, 10 Drawing Sheets

(56) References Cited

U.S. PATENT DOCUMENTS

| | | | | |
|---|---|---|---|---|
| 2008/0134193 | A1* | 6/2008 | Corley | G06F 9/52 |
| | | | | 718/104 |
| 2008/0256099 | A1* | 10/2008 | Chodorov | G06Q 10/10 |
| 2009/0018798 | A1* | 1/2009 | Dorneich | G06F 17/18 |
| | | | | 702/179 |
| 2012/0307750 | A1* | 12/2012 | Hunukumbure | H04W 16/02 |
| | | | | 370/329 |
| 2013/0246228 | A1* | 9/2013 | Xing | G06Q 10/087 |
| | | | | 705/28 |
| 2014/0019471 | A1* | 1/2014 | Linton | G06N 5/02 |
| | | | | 707/759 |
| 2014/0324521 | A1* | 10/2014 | Mun | G06Q 10/06393 |
| | | | | 705/7.28 |
| 2015/0046363 | A1* | 2/2015 | McNamara | G06Q 10/0833 |
| | | | | 705/333 |

OTHER PUBLICATIONS

Antoniou, Andreas, "Chapter 14: Design of Recursive Filters Using Optimization Methods", Digital Filters: Analysis, Design and Applications, 2nd edition, McGraw-Hill, (1993), 489-513.

Bollerslev, Tim, "Generalized Autoregressive Conditional Heteroskedasticity", Journal of Econonmetrics 31, (1986), 307-327.

Forrester, Jay, "Industrial Dynamics—After the First Decade", Management Science, vol. 14, No. 7, Theory Series, [Online]. Retrieved from the Internet: <URL: http://www.jstor.org/stable/2628888>, (Mar. 1968), 398-415.

Glasserman, Paul, Monte Carlo Methods in Financial Engineering, Springer, (2003), 599 pgs.

Gopal, M, "Chapter 12: Stochastic Optimal Linear Estimation and Control (Sections 12.3-12.5)", Modern Control System Theory, 2nd Edition, (1993), 597-619.

Hamilton, James, Times Series Analysis, (1994), 813 pgs.

Hyndman, R, et al., Forecasting with Exponential Smoothing: The State Space Approach, Springer Series in Statistics, (2008), 370 pgs.

Lutkepohl, H, New Introduction to Multiple Time Series Analysis, Springer, (2005), 764 pgs.

Magnus, J, et al., Matrix Differential Calculus with Applications in Statistics and Econometrics, 3rd Edition, John Wiley & Sons, Inc., (1999), 468 pgs.

Mathis, Steven, et al., "Chapter 12: Costs of Production in the Short Run", Microeconomic theory: An Integrated Approach, (2002), 289-320.

Nusawardhana, S, et al., "Discrete-Time Synergetic Optimal Control of Nonlinear Systems", Journal of Guidance,Control, and Dynamics vol. 31, No. 6., (Nov.-Dec. 2008), 1561-1574.

Ruiz, Esther, et al., "Bootstrapping Financial Time Series", J. Econom. Surv. 16, (2002), 271-300.

Sengupta, Jati, et al., "Chapter 5: Economic Implications of Stochastic Control", Control Theory Methods in Economics, Kluwer Academic Publishers, (1997), 147-160.

Sethi, Suresh, et al., Optimal Control Theory: Applications to Management Science, 2nd Edition, Springer, (2000), 511 pgs.

Stengel, Robert, Stochastic Optimal Control, John Wiley & Sons, (1986), 652 pgs.

\* cited by examiner

COMPUTATIONAL ARCHITECTURE AND METHOD FOR A TIME-VARYING CONTROL SYSTEM

PRIOR APPLICATION

This Application claims the benefit of U.S. Provisional Application No. 62/038,600 filed on Aug. 18, 2014, the disclosure of which is incorporated by reference herein.

FIELD OF THE INVENTION

The invention relates generally to an adaptive time varying control system, and more particularly to the use of computational models and machine-executed simulations to predict the operational stability of an enterprise and its production performance. Embodiments of the invention relate to improving the working computational models that represent the operational performance of an enterprise and implementing those models in specialized computer systems.

BACKGROUND OF THE INVENTION

Enterprises, such as producers of goods or services, systematically allocate resources between a variety of produced goods or services. For example, a manufacturer of goods can conduct its operations by allocating a portion of the revenue stream, the working capital, to the production of multiple products, invest another portion into research and development, equipment purchases, or stock purchases, and allocate yet another portion of its revenue stream to payment on debts. Generally, such enterprises wish to allocate their resources to maximize the accompanying revenue, profit and return on investment (ROI).

Often, the marginal cost of production of each product or service varies, as does the selling price for that product. Furthermore, the marginal cost and selling price of a product can be different in various regions. Thus, there can be an optimal allocation of resources which will provide the maximum return on investment to the enterprise. Finding this optimal allocation has been an immensely difficult challenge for enterprise operators.

Known methods for determining the optimal allocation of resources utilize time variant or invariant control theory applied to enterprise production. For instance, see Jati K. Sengupta, Phillip Fanchon, "Control Theory Methods in Economics" (1997). However, in situations where the control system is using a mathematical enterprise model and variables affecting the optimal allocation of resources are themselves functions of time, known control systems tend to be unable to provide complete guidance on the proper allocation of resources.

Another challenge with optimizing, or otherwise controlling, the allocation of resources within an enterprise is achieving usable, accurate modeling of complex dynamical systems or non-stationary processes. When computational tools are applied in areas such as economics, biology, medicine, and the like, where the systems are subject to myriad time-varying influences from numerous, often interrelated, parameters, conventional control system techniques, which involve modeling of the system, tend to fall short for lack of modeling accuracy.

In view of these, as well as other, challenges, a need exists for a practical technological solution for computationally controlling the allocation of resources in an enterprise.

SUMMARY OF THE INVENTION

Time-varying control systems are applied for controlling the performance, including optionally also controlling the operational stability, of a product production enterprise.

According to one aspect of the invention, a system for controlling an enterprise is constructed with computing hardware, including at least one processor, data storage, and input/output facilities operatively coupled to the at least one production process of the enterprise, the data storage containing instructions that, when executed by the at least one processor, cause the computing hardware to implement a set of computing engines.

A main processing engine is configured to generate a control vector corresponding to a target allocation of resources between the plurality of products to be produced by the enterprise, the control vector being applied to adjust operation of the at least one production process for each of the products. An actual revenue measurement engine is configured to obtain data representing actual revenue generated by sales of each of the plurality of products in a market during a first time period, such as the current time period. An actual cost measurement engine is configured to obtain data representing actual cost attributed to each of the plurality of products during the first time period. A retained earnings computation engine is configured to produce an observation vector containing elements in a data structure representing actual retained earnings attributed to each of the plurality of products during the first time period, the actual retained earnings being based on the data representing the actual revenue and on the data representing the actual cost.

A matrix generator engine is configured to generate a dynamic matrix, a control matrix, a cost matrix, and an observation matrix. The dynamic matrix contains elements arranged in a data structure that represents a dynamic relationship between a current set of revenue values and a predicted set of revenue values at a second time period subsequent to the first time period. The control matrix contains elements arranged in a data structure that represents a dynamic relationship between the control vector and the actual revenue corresponding to each product. The cost matrix contains elements arranged in a data structure that represents a dynamic relationship between variations in the market and actual revenue corresponding to each product. The observation matrix contains elements arranged in a data structure that represents a dynamic relationship between the actual revenue corresponding to each product and the actual retained earnings.

The system further comprising an estimator engine configured to revise the dynamic matrix, the control matrix, the cost matrix, and the observation matrix for the second time period to produce predicted values for each corresponding matrix.

Advantageously, the system provides a practical computational architecture for controlling complex dynamic, non-stationary systems such as production enterprises. Principles of the system are applicable in a wide variety of other endeavors, as will be appreciated by persons having skill in the relevant arts.

In a related aspect of the invention, a method for controlling an enterprise that produces a plurality of products by at least one production process is provided. The method is carried out automatically by a computing system. According to the method, a control vector is generated corresponding to a target allocation of resources between the plurality of products to be produced by the enterprise, the control vector being applied to adjust operation of the at least one production process for each of the products. Data is obtained representing actual revenue generated by sales of each of the plurality of products in a market during a first time period, and actual cost attributed to each of the plurality of products during the first time period. An observation vector is produced containing elements in a data structure representing actual retained earnings attributed to each of the plurality of products during the first time period, the actual retained earnings being based on the data representing the actual revenue and on the data representing the actual cost.

A dynamic matrix, a control matrix, a cost matrix, and an observation matrix, are generated. The method further includes revising each of these matrices for the second time period to produce predicted values for each corresponding matrix. The revising can include vectorization of the matrices and prediction of future values.

According to certain embodiments, modeling of complex, non-stationary systems is avoided by virtue of the revising of the matrices to produce predicted mappings between the various parameters. In one aspect of the invention, the utilization of the cost matrix takes exogenous factors into account in a computationally-efficient and practical manner. For example, for economic applications the cost matrix will map the cost vector depending on demand and current market state to the system's state vector. Further computational efficiencies are gained in the obtaining of the control vector (also called control law) affecting the system's performance using numerical techniques based on the measured (current time period) and estimated (next time period) state and cost vectors and on updated and estimated matrix values, thereby avoiding dependency on any the myriad of difficult-to-model parameters.

DETAILED DESCRIPTION

Figure 1:
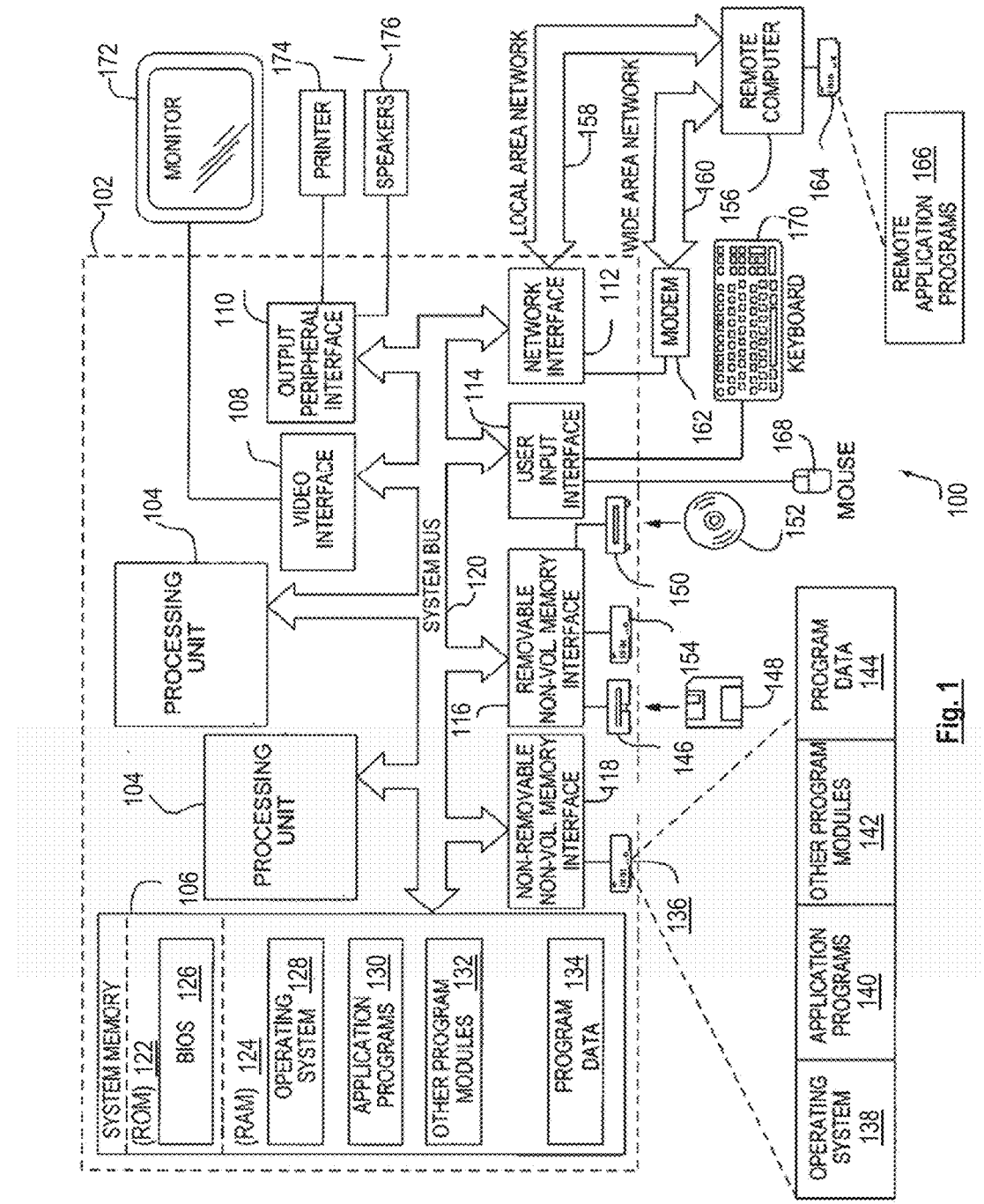
FIG. 1 is a block diagram illustrating an example of a general-purpose computer system on which aspects of the invention may be carried out, according to an embodiment.

One aspect of the invention is directed to a system for the efficient allocation of resources among multiple products or services. This system uses historical data representing the actual and estimated costs, revenues, and retained earnings values (represented as suitable data structures such as vectors) and corresponding dynamic control, cost, observation and covariance values (represented as suitable data structures such as matrices) associated with the products created during each considered time period. With the understanding that other suitable data structures could be utilized besides vectors and matrices, for purposes of brevity, the terms "vector" and "matrix" in the present context are meant to embody corresponding equivalent data structures with which the principles of the invention may be carried out computationally.

The actual and expected vectors and corresponding matrices are used to generate a control vector (that represents a planning/budgeting policy) that sets out the proper allocation of resources. The resource allocation control system according to certain embodiments of the invention is a linear discrete time, time varying control system with dynamic control, cost, and observation matrices computed based on previously-taken-into-account estimated and actual vectors and matrices. Some embodiments are based on an exact inverse problem solution methodology and forecasting explicitly expressed by the dynamic, cost, control and observation matrices as functions of the cost, revenue, and retained earnings (actual and estimated vectors) and covariance matrices.

Advantageously, these embodiments do not require any linear or non-linear process models, or Taylor series expansion always requiring small parameters. In a related embodiment, modeling is used only if more frequent results are needed than the available time granularity for the incoming raw data is able to provide.

Aspects of the present invention can be implemented as part of a computer system. The computer system can be one physical machine, or can be distributed among multiple physical machines forming a computer network, such as by role or function, or by process thread in the case of a cloud computing distributed model. In various embodiments, aspects of the invention can be configured to run in virtual machines (e.g., system virtual machines, operating system-level virtual machines, process virtual machines, or any combination thereof) that in turn are executed on one or more physical machines. It will be understood by persons having skill in the art that features of the invention may be realized by a variety of different suitable machine implementations.

In related embodiments, the output of the resource allocation control system are operatively coupled, either directly, or through an intermediary system or process, to a factory or a production line.

In other related embodiments, the output of the resource allocation control system are operatively coupled, either directly, or through an intermediary system or process, to a transaction processing system.

In other related embodiments, the output of the resource allocation control system are operatively coupled, either directly, or through an intermediary system or process, to a graphical user interface.

Notably, in the present context, unless expressly limited in a particular embodiment or claim, a "product" includes articles of manufacture, as well as any revenue-generating output that an enterprise produces. For example, a product can include a financial product, such as an investment, a payment on a loan, or a stock buyback, among others. Furthermore, a product can also constitute a service, or other work product, that does not require generation of a physical article as an output. As a general rule, an enterprise utilizes resources to produce its products. The allocation of these resources can be set by an entity in control of the enterprise, such as an executive officer.

Furthermore, conventional mathematical notation is used throughout to describe certain data structures. For example, the term "matrix" is used throughout the application to describe multi-variable data structures. In various embodiments, matrices can include any suitable data structure, stored in a non-transitory computer-readable storage medium, which represents a plurality of multi-variable items, such as vectors, tuples, arrays, ordered lists, or the like. Likewise, "vectors" can include any data that include an arrangement or order, such as a list or array of data. Matrices are referred to as having columns and rows; this notation is used for ease of description and to comport with conventional notation used to describe these data structures. It should be understood that there is no need for the data in a "column," for example, to be actually stored. Rather, it is sufficient that the data in a column include some indicia of a position within a larger data structure.

FIG. 1 is a diagram illustrating computer system 100, on which aspects of the invention may be implemented according to various embodiments. Computer system 100 may include a computing device such as personal computer 102. Personal computer 102 includes one or more processing units 104, system memory 106, video interface 108, output peripheral interface 110, network interface 112, user input interface 114, removable memory interface 116 and non-removable memory interface 118, and system bus 120, which in some embodiments may include a high-speed communications channel coupling the various components previously described.

In various embodiments, processing units 104 may have multiple logical cores that are able to process information stored on computer readable media such as system memory 106 or another memory attached to removable memory interface 116 and/or non-removable memory interface 118. System memory 106 can include non-volatile memory such as Read Only Memory (ROM) 122 or volatile memory such as Random Access Memory (RAM) 124. ROM 122 may include pre-operating system environment 125 to help communicate with other portions of computer 102. Pre-operating system environment 125 can include basic input/output system (BIOS) functionality, as well as additional functionality such as specialized applications that can be executed without the operating system. RAM 124 can store portions of various software applications such as the operating system 128, application programs 130 and other program engines 132. Further, RAM 124 can store other information such as program or application data 134. In various embodiments, RAM 124 can store information that requires low latencies and efficient access, such as programs and data being manipulated or operated upon. In various embodiments RAM 124 comprises Double Data Rate (DDR) memory, Error Correcting memory (ECC) or other memory technologies with varying latencies and configurations such as RAMBUS or DDR2 and DDR3. In this way, in various embodiments, system memory 106 can store the input data store, access credential data store, operating memory data store, instruction set data store, analysis result data store and the operating memory data store. Further, in various embodiments, processing units 104 can be configured to execute instructions that limit access to the aforementioned data stores by requiring access credential before access to the information is granted.

Removable memory interface 116 and non-removable memory interface 118 can couple computer 102 to disk drives 136. In some embodiments, disk drives 136 can include SSD or rotational disk drives. Disk drives 136 can provide storage for various software applications such as the operating system 138, application programs 140 and/or other program engines 142. Further, disk drives 136 can store other information such as program or application data 144. In various embodiments, disk drives 136 store information that does not require the same low latencies as other storage mediums. Further, data stored as operating system 138, application program 140 data, program engines 142 and program or application data 144 can be the same information as that stored in the RAM 124 in various embodiments mentioned above, or they can be different data potentially derivative of the RAM 124 stored data.

Further, removable non-volatile memory interface 116 may couple the computer 102 to magnetic portable disk drives 146 that utilize magnetic media such as floppy disk 148, Iomega® Zip or Jazz, or optical disk drives 150 that utilize optical media 152 for storage of computer readable media such as Blu-Ray®, DVD-R/RW, CD-R/RW and other similar formats. Still other embodiments utilize SSD or rotational disks housed in portable enclosures to increase the capacity of removable memory.

In the embodiment shown in FIG. 1, computer 102 can utilize the network interface 112 to communicate with one or more remote computers 156 over a local area network (LAN) 158 or a wide area network (WAN) 160. Network interface 112 can utilize a Network Interface Card (NIC) or other interface such as modem 162 to enable such communication. Modem 162 can enable communication over telephone lines, coaxial, fiber optic, power line, or wirelessly. Remote computer 156 can contain a similar hardware and software configuration or else it can have memory 164 that contains remote application programs 166 to provide additional computer readable instructions to computer 102. In various embodiments, remote computer memory 164 can be utilized to store information such as identified file information that may be later downloaded to local system memory 106. Further, in various embodiments remote computer 156 may be an application server, an administrative server, client computers, or a network appliance.

A user may enter information to computer 102 using input devices connected to user input interface 114, such as mouse 168 and/or keyboard 170. Additionally, the input device may be a trackpad, fingerprint scanner, joystick, barcode scanner, media scanner, or the like. Video interface 108 may provide visual information to a display such as monitor 172. Video interface 108 can be an embedded interface or a discrete interface. Further, the computer may utilize a plurality of video interfaces 108, network interfaces 112, removable interfaces 116, and/or non-removable interfaces 118 in order to increase the flexibility in operation of computer 102. Further, various embodiments utilize several monitors 172 and several video interfaces 108 to vary the performance and capabilities of computer 102. Other computer interfaces may be included in computer 102, such as output peripheral interface 110. According to the embodiment shown in FIG. 1, output peripheral interface 110 can be coupled to printer 174 or speakers 176, and in various embodiments can be connected to other peripherals to provide additional functionality to computer 102.

Various alternative configurations and implementations of the computer are also contemplated. These variations may include, without limitation, additional interfaces coupled to system bus 120 such as universal serial bus (USB), printer port, game port, PCI bus, PCI Express or integrations of the various components described above into chipset components such as the northbridge or southbridge. For example, in various embodiments, processing unit 104 can include an embedded memory controller (not shown) to enable more efficient transfer of data from system memory 106 than system bus 120 could otherwise provide.

Figure 2:
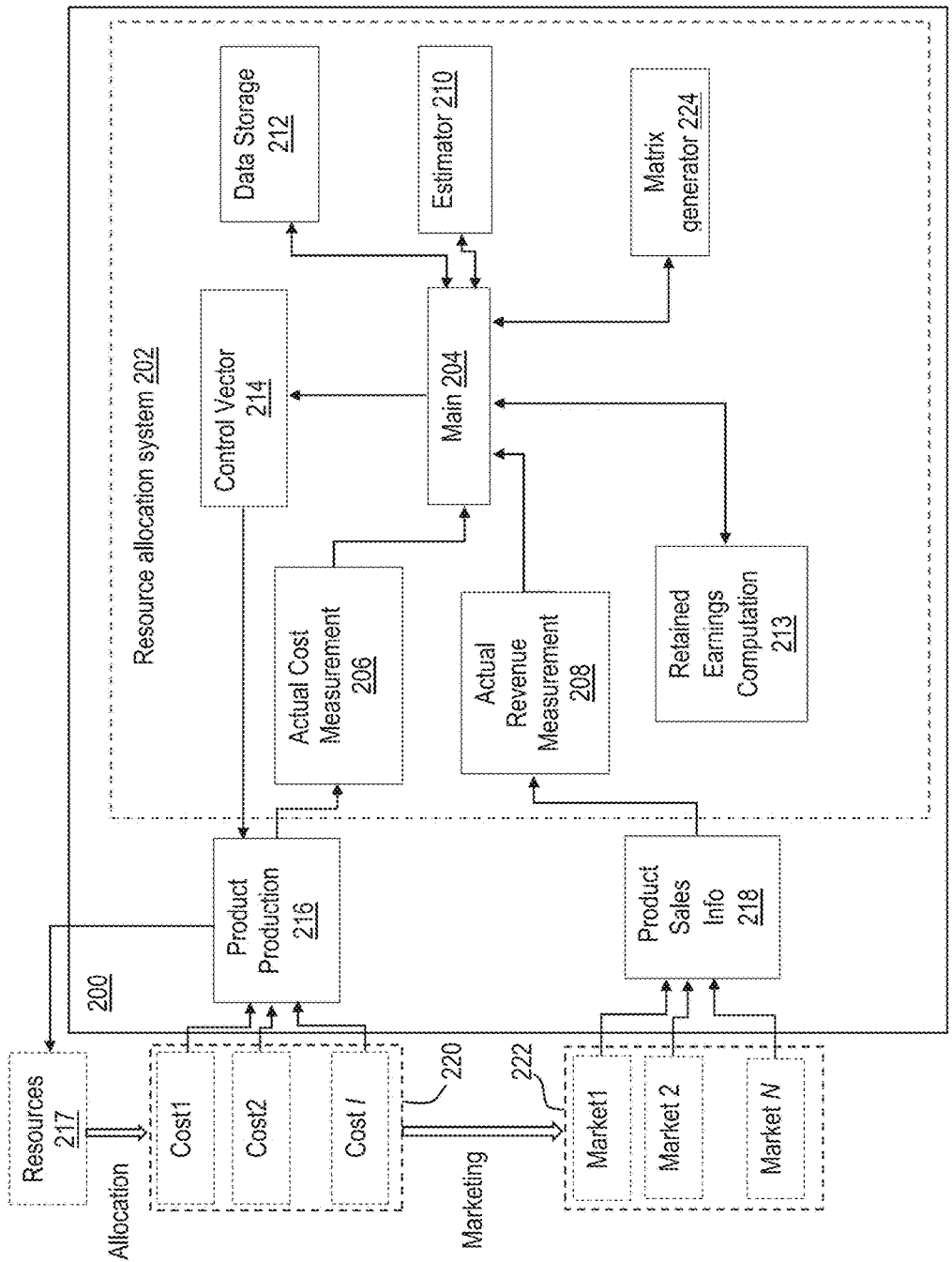
FIG. 2 is a schematic diagram illustrating a system for the allocation of resources within an enterprise, according to an embodiment.

FIG. 2 is a schematic diagram illustrating a computing architecture for an enterprise control system 200 according to one embodiment. Enterprise control system 200 features a set of inter-operative engines. Each of the various engines is constructed, programmed, configured, or otherwise adapted, to carry out a function or set of functions. The term "engine" as used herein means a real-world device, component, or arrangement of components implemented using hardware, such as, for example, an application specific integrated circuit (ASIC) or field-programmable gate array (FPGA), or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of a engine can be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of suitable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined functionality; however, it should be understood that in other contemplated embodiments, each functionality might be distributed to more than one engine. Likewise, in other contemplated embodiments, a single engine that performs those multiple functions, possibly alongside other functions, or distributed differently among a set of engines than specifically illustrated in the examples herein may implement multiple defined functionalities.

Enterprise control system 200 includes resource allocation system 202, which in one embodiment is implemented as application program 16 controlling the operation of computer system 100 of FIG. 1, thereby creating a special-purpose machine. Resource allocation system 202, in turn, includes main function 204, actual cost measurement engine 206, actual revenue measurement engine 208, estimation engine 210, data storage engine 212, and control vector generator 214. Enterprise control system 200 further includes product production engine 216 and product sales info engine 218. Product production engine 216 generates input signals to production lines, such as a factory implementing a production process. Product production engine 216 computes costs 220, each associated with one of the products. Product sales info engine 218 is associated with a variety of markets 222, from which it collects and computes product sales information.

In the embodiment shown in FIG. 2, resource allocation system 202 is a computer-executable system for automatically determining allocation of the revenues of an enterprise in a controlled fashion to improve performance of the enterprise. According to the architecture of resource allocation system 202, main function engine 204 calls a variety of other engines in order to perform operations that constitute a portion of the sequence of inter-operative functions that, together, achieve the result of determining a resource allocation. Main function 204 calls actual cost measurement engine 206 to obtain and structure incoming data representing the actual costs associated with production of products during a time period l from product production engine 216. In one embodiment, actual cost measurement engine 206 formats the obtained actual cost data into a data structure that can be stored and processed efficiently by the system. By convention, $t_l$ is the time point corresponding to the end of time frame l that the system 202 has measured. $t_{l-1}$ is the time at the end of the previous time period l-1, and so on. Data storage engine 212, e.g., implemented with a volatile or non-volatile data storage device and a database structure, stores vectors corresponding to the current time period (or, in the case of the control vector, the $t_{l+1}$ time period), and also stores matrices corresponding to historical data on the enterprise's performance.

Main function 204 also calls actual revenue measurement engine 208 to add the current (time period l) revenue value into the data storage engine 212. Main function 204 calls estimator engine 210 to generate estimated costs and revenues during the time period l. Main function 204 passes these estimated and actual data to data storage engine 212. Using the information stored by data storage engine 212, and using a control algorithm described in detail below, main function 204 generates control vector 214, which indicates the weighting for the allocation of resources managed by enterprise control system 200. Control vector 214 is passed to product production engine 216, which adjusts the allocation of resources 217 such that they are invested more advantageously as per the control vector 214.

In the embodiment shown in FIG. 2, actual cost measurement system 206 interacts with product production engine 216 to receive data relating to the actual cost of producing products. Likewise, actual revenue measurement engine 208 interacts with product sales info engine 218 to obtain and calculate actual revenues associated with the produced products. As mentioned above, product production engine 216 allocates resources among a variety of product costs 220. Costs 220 can represent, for example, manufacturing equipment costs, investment asset purchase costs, loan repayment costs, or payroll costs. Often, costs 220 will include not only those costs directly attributed to the production of each product, but also an indirect cost—a proportional share of the operating expenses of the enterprise that are not directly attributable to a particular product. As a result of these expenditures, and as indicated in FIG. 2 by the double arrow, products are marketed in a variety of markets 222. Each of these products and markets 222 is associated with a quantity of revenue, the sum of which is collected and computed by product sales info engine 218 and passed to resource allocation system 202 via actual revenue measurement engine 208. Actual revenue measurement engine 208 formats the obtained data from product sales info engine 218 into a suitable data structure for efficient storage and computation.

Retained earnings computation engine configured to produce an observation vector that represents actual retained earnings attributed to each of the plurality of products during the l-th time period, with the actual retained earnings being based on the data representing the actual revenue and on the data representing the actual cost.

Resources are allocated during l-th period based on control vector 214 computed during (l−1)-th time period, and communicated to product production engine 216. The products following from the allocation of resources among the costs 220 result in revenues during the l-th time period (and/or later) as they are sold in markets 222. These actual revenues during the l-th time period can vary from the revenues expected at the time that control vector 214 was formed at the end of the (l−1)-th time period. The outputs of estimator engine 210 at the end of the (l−1)-th time period, which are stored by data storage engine 212, are compared with the actual costs and actual revenues measured by actual cost measurement engine 206 and actual revenue measurement engine 208, respectively. This comparison, as well as weighted historical data from even earlier time periods, is used to fine-tune control vector 214 for optimal allocation of resources during the next time interval, (l+1).

As will be described in greater detail below, a set of mappings are utilized by the system to define relationships between inputs, outputs, and market disturbances. In one embodiment, matrix generator engine 224 generates a dynamic matrix, a control matrix, a cost matrix, and an observation matrix. Each of these matrices contains elements arranged in a suitable data structure, such as one having rows and columns to facilitate computational operations. The dynamic matrix represents a dynamic relationship between a current set of revenue values and a predicted set of revenue values at the next subsequent time interval. The control matrix represents a dynamic relationship between the control vector and the actual revenue corresponding to each product. The cost matrix represents a dynamic relationship between variations, or disturbances, in the market (e.g., changes in demand, logistical issues, etc.), and actual revenue corresponding to each product. In certain cases, the cost matrix represents an influence of the cost of other products to the revenues for each given product. The observation matrix represents a dynamic relationship between the actual revenue corresponding to each product and the actual retained earnings.

Advantageously, instead of modeling a complex dynamic system, the resource allocation system 202 automatically revises the dynamic, control, cost, and observation matrices for each time period. The revision has two components: (a) vectorization; and (b) forecasting, each of which is described in greater detail below.

In various embodiments, the data referred to throughout the flow chart can be generated based upon a variety of real-world implementations. For example, in one embodiment, the dynamic stability control system could be used to manufacture tires. In the tire-manufacturing context, the costs associated with the production of tires in various plants can vary, for example, based upon different costs for materials, energy, and/or labor in various locations. The revenues associated with the tires produced also varies with the market into which they are sold; in some locations, the market may support much higher prices than in others. Notably, the production location and the market location need not be the same (although shipping costs from one location to another may be included in costs). Furthermore, the costs of production and the sales price of the tires can vary as a function of time. Such fluctuations can be seasonal, or can be a result of a temporary imbalance in the market (such as a material shortages), the result of some competitor's entry or departure from the marketplace, or can be representative of more long-term changes in a given market. As such, it is desirable to measure data corresponding to these real-world conditions, and adjust the production and sales of tires (or another commodities) between various plants and markets to ensure stability of the enterprise, as well as achieve some desired goals relating to profitability when possible.

Figure 3:
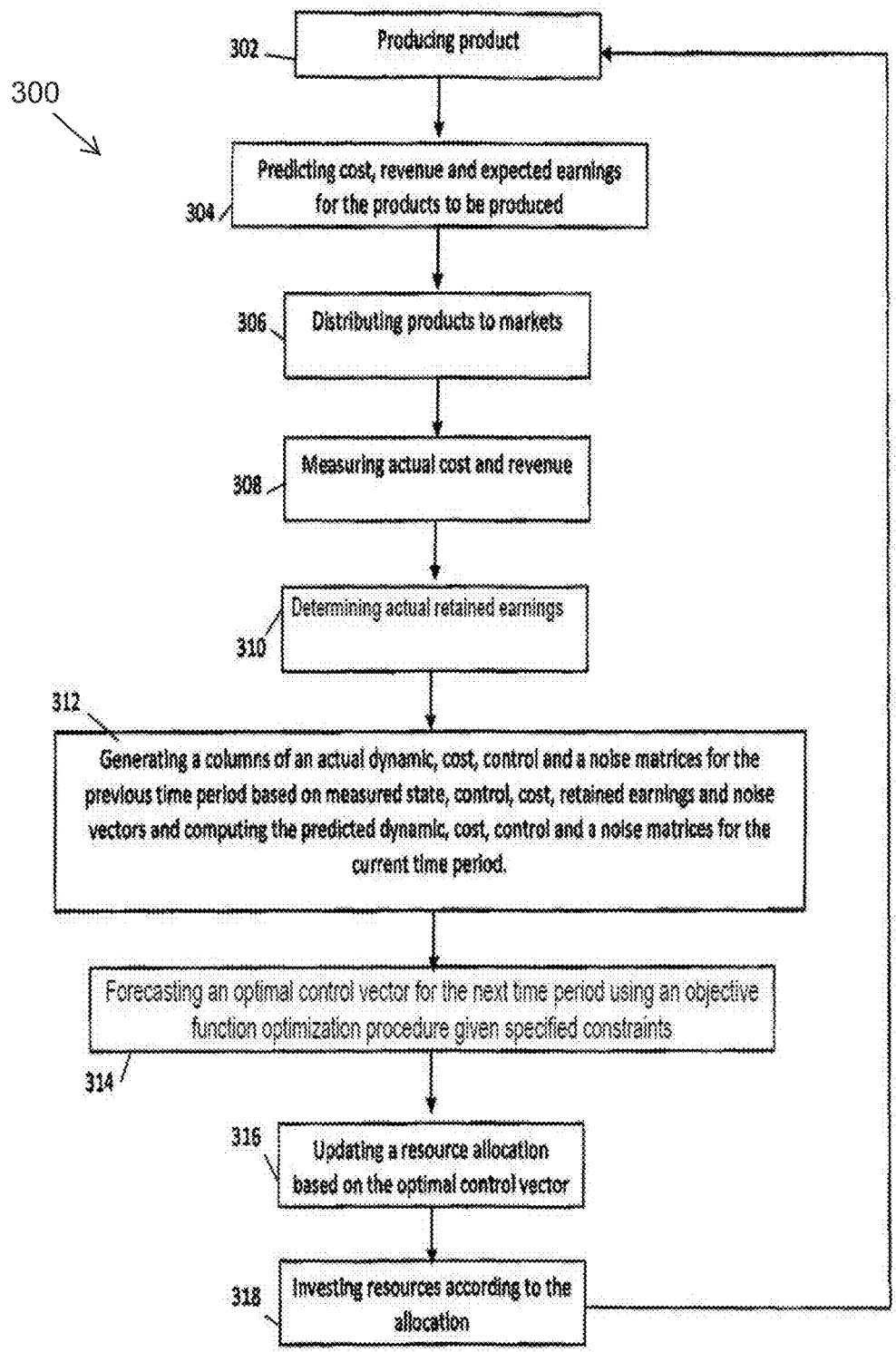
FIG. 3 is a block diagram illustrating a method for allocation of resources within an enterprise, according to an embodiment.

FIG. 3 is a process flow diagram illustrating a method 300 for determining, or guiding, the allocation of resources. In one type of embodiment, much of the method is performed automatically, i.e., without human interaction, such that it is carried out by the computing architecture described above with reference to FIG. 2. In other embodiments, certain process operations may involve a combination of automatic operation of the system, together with human-executed actions in response to certain system-generated outputs. Method 300 includes a loop, and can continue to operate recursively. In fact, with a greater number of iterations, method 300 will become more accurate at allocating resources in an increasingly optimal fashion due to continually-increasingly data from which to generate forecasts. An allocation of resources among a variety of products can be determined by method 300. The allocation of resources determined by method 300 need not require the allocation of resources to be optimal or achieve a best-possible result. Rather, the allocation of resources determined by method 300 improves the variable under analysis towards a theoretically-best result, with some predefined criteria (e.g., enterprise operational stability) being satisfied.

The products are produced at block 302. In other embodiments, products need not be produced to implement method 300. For example, in some embodiments, estimates of the production data (e.g., estimates of revenues and costs associated with production) could be used by method 300. Within some other embodiments, historical data relating to the production can be imported (e.g., exogenous factors), even though they were not obtained in accordance with method 300.

At block 304, revenue and costs associated with the produced products are predicted. Prediction of costs associated with production takes into account the expected costs of manufacturing, marketing, and distribution expenses. Often, the article's marginal production cost varies greatly. Similarly, the marginal revenue associated with the production can vary. Factors that affect marginal revenue include the market into which the product is sold, the demand for the product in that market, and the supply of the product being produced. As such, total expected revenue $\hat{R}$ is the sum of the expected marginal prices p of each of the q units of goods sold in each market:

$$\hat{R} = \sum_{i=1}^{I} \sum_{n=1}^{N} \hat{p}_{\{i,n\}} \hat{q}_{\{i,n\}}, \tag{1}$$

where I is the total number of goods or services prepared to be sold on the market and N is the total number of markets where goods and/or services are prepared to be sold. "$\hat{p}_{\{i,n\}}$" is the expected price and "$\hat{q}_{\{i,n\}}$" is the quantity of the i-th product prepared to be sold on the market. The revenue corresponding to some particular products and/or markets can be computed from equation (1) by excluding some markets and products.

At block 306, the produced products are distributed to the markets. A market can be any geographical territory, such as a country or set of countries, a state (province) or set of states (provinces), or a ZIP code or set of ZIP codes etc. In similar fashion, a market can be a store, or a retail or wholesale chain of stores.

At block 308, actual revenue R and actual costs are calculated. Actual revenue R is often different from expected revenue $\hat{R}$. Minimization of the difference between actual and projected revenues can be one of the enterprise performance optimization criterion. In some cases, the expected price can vary from the actual price due to fluctuations or poor estimates of the market demand and/or supply. Similarly, actual costs can vary from its expected values.

At block 310, retained earnings are computed. Retained earnings is the portion of revenue remaining after inevitable expenses like taxes, debt reimbursement were paid. It is assumed that these earnings are available for reinvestment into the business, and can be used for advertisement, for the business expansion into new markets or new products. Retained earnings depends on the actual and expected revenues, dividends, and also takes into account indirect cost, such as overhead not directly related to the production process.

At block 312, a column of data is added to each of an expected dynamic, control, cost and observation matrices based on corresponding estimations. Each of these matrices includes an array of vectors that contain information related to a particular time period. By convention, these time periods and a clock measurement at the end of the time period will be referred to as 0, 1, 2, . . . l. In various embodiments the reallocation of resources under method 300 can be done at various intervals. By way of example, a stock reallocation system can utilize time intervals that are fractions of a second, whereas a heavy machining company may wish to utilize time intervals of weeks, months or even quarters.

An actual $\vec{x}(l)$ or estimated $\hat{\vec{x}}(l)$ "state vector" is defined as a set of its components (transposition is indicated by the "$T$" symbol). Each element of the state vector is the revenue associated with the i-th product sold during a l-th period on all available markets:

$$\vec{x}(l)=(x_1(l),x_2(l),\ldots x_n(l))^T. \quad (2)$$

Estimated vectors and matrices are denoted as measured with additional symbol "^" above the corresponding measured vectors and matrices. State vector $\vec{x}(l)$ exists as a data structure stored in a non-transitory computer-readable medium.

Similarly, an actual $\vec{u}(l)$, $\vec{d}(l)$ and expected $\hat{\vec{u}}(l)$, $\hat{\vec{d}}(l)$ control $\vec{u}(l)$ and a cost vectors are data structures stored in a non-transitory, computer-readable medium. Control $\vec{u}(l)$ and a cost $\vec{d}(l)$ vectors can be defined such way that they correspond to the resource allocation weights and actual (or expected) cost for the products, respectively measured or estimated during period l:

$$\vec{u}(l)=(u_1(l),u_2(l),\ldots u_n(l))^T, \quad (3)$$

$$\vec{d}(l)=(d_1(l),d_2(l),\ldots d_n(l))^T \quad (4)$$

for the estimated control and cost vectors.

Similarly to the states, control, cost and retained earnings vectors, the dynamic, control, cost and observation matrices are predicted for every subsequent time period and updated as soon as updated states, control, cost and retained earnings vectors values become available. In one embodiment, the dynamic, control, cost and observation matrices update procedure is a generalization of the list square estimation procedure such as described in H. Lutkepohl, "New Introduction to Multiple Time Series Analysis" (2005) incorporated by reference herein.

Accordingly, in this embodiment, a sliding historical state matrix X(l) is created, which is updated to include the state data measured or estimated during time periods l-L+1 . . . l.

$$X(l)=[\vec{x}_1(l-L+1),\vec{x}_2(l-L),\ldots \vec{x}_n((l)], \quad (5)$$

where "L" is the number of the historical periods taken into account. Historical matrix Z(l-1) is also created which includes state, control, and cost matrices measured or estimated during time periods l-L . . . l-1. These time periods are chosen due to the causality condition: control vector $\vec{u}(l)$ and cost vector $\vec{d}(l)$ obtained during period l do not affect current state vector $\vec{x}(l)$ but affect a next period state $\vec{x}(l+1)$. In other words, the values of the control and cost vectors that are expected to be active during period "l+1" are estimated during period "l" and denoted as $\hat{\vec{u}}(l)$ and $\hat{\vec{d}}(l)$ respectively. The actual control and cost vectors' values can be measured after estimation and denoted as $\vec{u}(l)$ and $\vec{d}(l)$. A Z-matrix is defined as:

$$Z(l-1) = \begin{bmatrix} \vec{x}(l-L) & \vec{x}(l-L+1)\ldots & \vec{x}(l-1) \\ \vec{u}(l-L) & \vec{u}(l-L+1)\ldots & \vec{u}(l-1) \\ \vec{d}(l-L) & \vec{d}(l-L+1)\ldots & \vec{d}(l-1) \end{bmatrix} \quad (6)$$

A historical noise matrix W(l-1) is created to include the fluctuations of state vector $\vec{x}$'s (denoted as $\vec{w}$) measured during time periods l-L . . . l-1.

$$W(l-1)=[\vec{w}(l-L)\vec{w}(l-L+1)\ldots \vec{w}(l-1)] \quad (7)$$

These matrices include historical data related to the resource allocation weights, as well as the cost, revenue, and retained earnings associated with those allocations. With increasing L, the quantity of computer-readable memory required storing these matrices increases and the time required processing them also increases. Accuracy of the estimation can require increasing of L. L value can be capped such that the memory and processing requirements are not overly cumbersome while obtaining a desired level of accuracy.

Cost vector estimation for $\vec{d}(l)$, which is used during "l+1"-th period can be performed based on available demand and inventory information (block 304) using known methodology such as, for instance, the method described in Steven Mathis, Janet Koscianski, "Microeconomic theory: An Integrated Approach", Prentice Hall (2002), incorporated by reference herein. The total cost $S_1(l+1)$ projected for the "l+1"-th period computed as the sum of the cost vector components:

$$S_1(l+1) = \sum_{i=1}^{l} \hat{d}_i(l) \quad (8)$$

A production policy that is associated with the estimated control vector $\hat{\vec{u}}(l)$ is computed at block 314. Vector $\hat{\vec{u}}(l)$ calculated during the l-th period will be "active" during "l+1"-th period. Depending on the selected optimization criteria and constraints the estimated revenue (state vector), $\hat{\vec{x}}(l-1)$, estimated cost vector $\hat{\vec{d}}(l-1)$, estimated retained earnings vector $\hat{\vec{y}}(l)$, predicted dynamic matrix $\hat{A}(l-1)$, control matrix $\hat{B}(l-1)$, cost matrix $\hat{C}(l-1)$ and observation matrix $\hat{H}(l)$ should be ready to be used. To do so, the retained earnings of block 310 are allocated among the products of block 302, such way that make the predictions in block 304 as close as possible to the corresponding target parameters, for example, return on investment (ROI), or profit and losses (P&L), etc.

In one embodiment, to estimate the optimal control vector for the period "l", an assumption is made that there exists a predicted dynamic matrix $\hat{A}(l-1)$, a control matrix $\hat{B}(l-1)$, and a cost matrix $\hat{C}(l-1)$ such that the state vector $\hat{x}$ at time period "l" is related to the state vector $\vec{x}$ at time period "l-1" by means of equation (9):

$$\vec{\hat{x}}^-(l)=\hat{A}(l-1)\vec{\hat{x}}^+(l)+\hat{B}(l-1)\vec{u}(l-1)+\hat{C}(l-1)\vec{d}(l-1)+\vec{w}_x(l-1)+\vec{w}_d(l-1), \quad (9)$$

where $\vec{\hat{x}}^-$ and $\vec{\hat{x}}^+$ are the a priori and a posteriori state (revenue) vector estimations, $\vec{w}_d(l)$ and $\vec{w}_d(l-1)$ are the fluctuation or noise of the state and cost vectors respectively, also stored in the computer-readable memory. These equations can be "vectorized" as described in J. R. Magnus, H. Neudecker, "Matrix differential calculus with Applications in Statistics and Econometrics", $2^{nd}$ Ed., (1999), which is incorporated by reference herein. For example, if $A(l-1)$ is an n×n matrix, vectorized matrix $\vec{A}$ will be a $n^2 \times 1$ vector:

$$\text{vec}(A)=\vec{a}=(A_{11},\ldots A_{n1},A_{12},\ldots A_{n2},A_{1n},\ldots A_{nn}) \quad (10)$$

A vectorized matrix is denoted with two arrows above the corresponding vector symbol. Since $B(l-1)$ is an n×m matrix, and $C(l-1)$ is an n×p matrix the vectorized control matrix $\vec{b}$ is a nm×1 vector, and the vectorized cost matrix $\vec{C}$ is a np×1 vector. A vectorized $Z(l-1)$-matrix denoted as $\vec{\beta}$ can be constructed from the vectorized dynamic, control, and cost matrices and stored in computer-readable memory:

$$\vec{\beta}(l-1)=\text{vec}[A(l-1),B(l-1),C(l-1)]=(A_{11}(l-1),\ldots A_{nn}(l-1),B_{11}(l-1),\ldots B_{nm}(l-1),C_{11}(l-1),\ldots C_{np}(l-1))^T. \quad (11)$$

$$[10]\vec{\beta}(l-1)=\begin{matrix}\vec{A}(l-1)\\\vec{B}(l-1)\\\vec{C}(l-1)\end{matrix}$$

Vectorized matrix $\vec{\beta}$ will be a $(n^2+nm+np)\times 1$ vector.

As a result the equation (9) can be re-written in the matrix form:

$$X(l)=[A(l-1),B(l-1),C(l-1)]Z(l-1)+W_x(l-1)+W_d(l-1). \quad (12)$$

Applying the operator "vec" on equation (12) from the left, the vectorized form of equation (9) will looks like:

$$\text{vec}(X(l))=\vec{\vec{x}}(l)=(Z^T(l-1)\otimes I_n)\vec{\beta}(l-1)+\text{vec}(W_x(l-1)+W_d(l-1)), \quad (13)$$

where $I_n$ is the identity n×n matrix.

To estimate the optimal control vector $\vec{u}^*$ the predicted dynamic $\hat{A}(l-1)$, control $\hat{B}(l-1)$, cost $\hat{C}(l-1)$ and observation $H(l)$ matrices are obtained. Any suitable forecast methodology can be applied during for operation according to various embodiments. For example, it can be one of the exponential weighted moving average (EWMA) methods such as the examples described in J. D. Hamilton, "Time series Analysis" (1994); R. J. Hyndman, A. B. Koehler, J. K. Ord, R., D. Snyder, "Forecasting with Exponential Smoothing: The State Space Approach (Springer Series in Statistics)" (2008); Paul Glasserman, "Monte Carlo Methods in Financial Engineering" (2003), or one of the time series methods such as "The VARMAX Procedure", SAS/ETS 13.2 User Guide, (2014), each of which is incorporated by reference herein.

The control vector $\vec{u}$ can be computed by minimizing the objective function J. In case of a tracking control system the objective function J is used to determine the optimal production policy vector $\vec{u}^*$ providing the minimum difference between target and projected system's attributes values. For example, the objective function J can be set such way that a projected level of ROI will be as close as possible to the predefined (target) ROI values. The predicted dynamic, control, cost and observation matrices should be used during calculations. The optimal policy $\vec{u}^*$ follows from the following equation, $$\frac{\partial J(\vec{\hat{u}}(l))}{\partial \vec{\hat{u}}(l)}=0 \quad (14)$$

and additional condition $$\frac{\partial^2 J(\vec{\hat{u}}(l))}{\partial \vec{\hat{u}}^2(l)}>0. \quad (15)$$

Computed optimal production policy $\vec{u}^*$ allows an enterprise to follow the optimal financial trajectory, i.e. optimally allocate available capital. Knowledge of $\vec{u}^*$ also allows the system to update the dynamic, control, cost and observation matrices to estimate a priori state vector $\vec{\hat{x}}^-$ and corresponding covariance matrix $P^-$ for the next time period.

At block 316, the resource allocation for the next time interval (l+1) is updated to reflect the latest changes of the control vector that was obtained in block 314. At block 318, resources are actually allocated among the products planned to be produced by the enterprise during the (l+1)-th period. This operation can involve human executive or operational actions in response to automatic system-generated recommendations. In another embodiment, the allocation of resources is automated. Along with allocation of resources, historical data, including the most recent revenue, cost, retained earnings and control data, can be stored for use in subsequent production cycles.

The updated dynamic, control, cost and observation matrices can then be computed using the expressions following from application of equation (13) and an estimation methodology. One such methodology according to an embodiment is the one described in H. Lutkepohl, "New Introduction to Multiple Time Series Analysis" (2005), or J. R. Magnus, H. Neudecker, "Matrix differential calculus with Applications in Statistics and Econometrics", $2^{nd}$ Ed. (1999), each of which is incorporated by reference:

$$\vec{\beta}(l-1)=((z(l-1)Z^T(l-1)Z(l-1)\otimes I_n)\vec{x}(l) \quad (16)$$

Similarly the observation matrix can be estimated as $$\vec{\beta}(l)=((X(l)X^T(l))^{-1}X(l)\otimes I_q)\vec{z}(l), \quad (17)$$

where $\vec{\beta}(l)=\text{vec}(H(l))$, $X(l)$ is defined in equation (5), $\vec{z}(l)=\text{vec}(Y(l))$ and $Y(l)=[\vec{y}(l-L+1), \ldots \vec{y}(l)]$, $\vec{y}(l)$ is the actual retained earnings vector measured during the period "l". Matrices estimations equations (16) and (17) do not depend on fluctuations of revenues (state), cost, and retained earnings.

According to this embodiment, estimation of the dynamic matrix can be performed based on an analytical relationship between the projected dynamic matrix values and measured historical values following from dynamic equation with linear control and cost laws according to:

$$A(l+1)=\ln\{A(l)A(l-1) \ldots A(l_0)\exp[\Sigma_{i=0}^l A(i)]\}.$$

Figure 4:
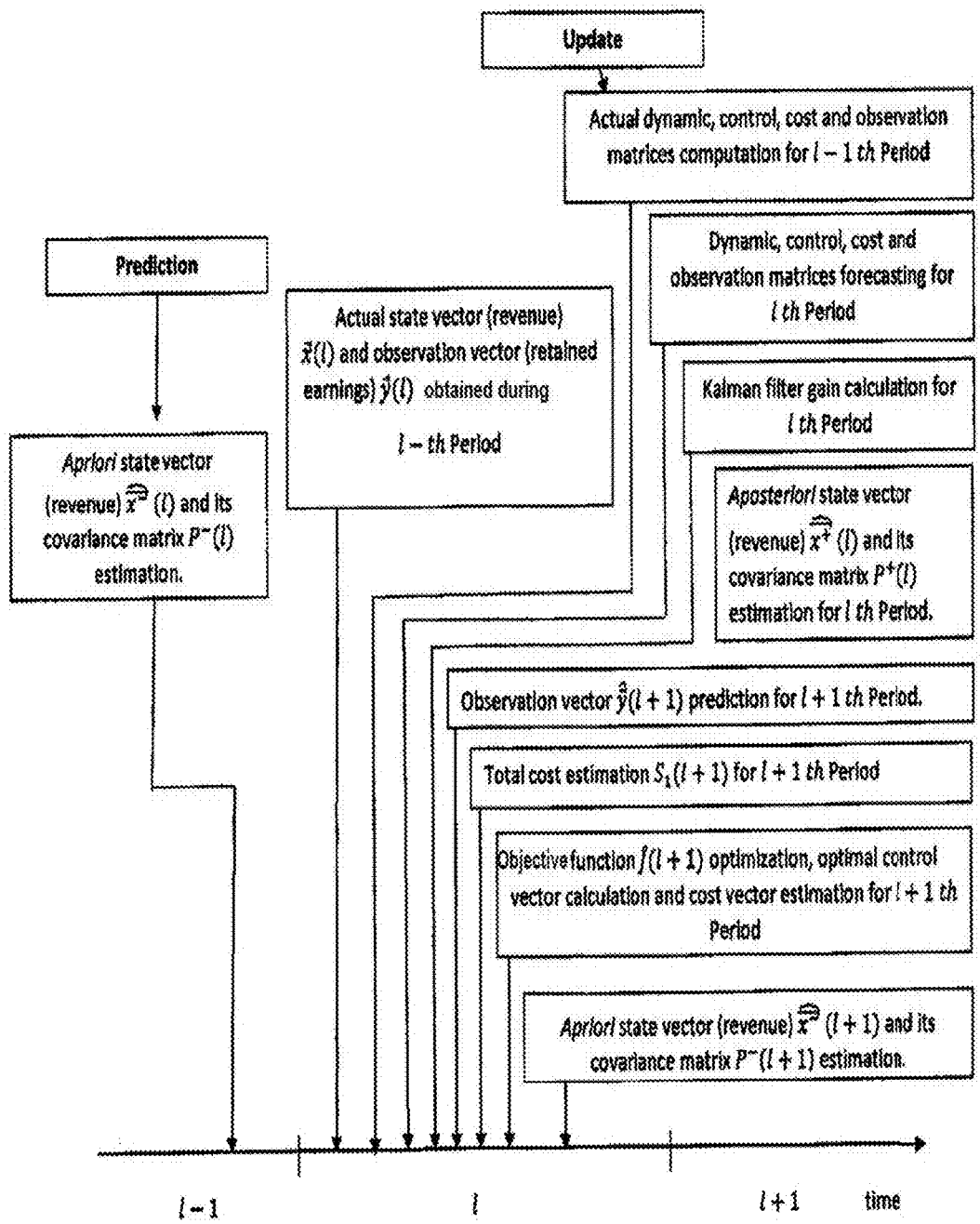
FIG. 4 is a timeline illustrating a priori and a posteriori matrix construction, according to an embodiment.

FIG. 4 illustrates a timeline for a cyclical process correcting the financial parameters of a system at every time period reflecting how the market parameters and rules changes affect an enterprise, according to an embodiment. At the end of the (l−1)-th period an actual state space vector, representing the actual revenue $\vec{x}(l-1)$, actual observation vector, representing the actual retained earnings $\vec{y}(l-1)$ the corresponding fluctuations vectors $\vec{w}_x(l-1)$ and $\vec{w}_y(l-1)$ are determined. The observation matrix $H(l-1)$ is estimated using equation (17). Predicted dynamic $\hat{A}(l-1)$, control $\hat{B}(l-1)$ and cost $\hat{C}(l-1)$ matrices and estimated cost $\hat{\vec{d}}(l-1)$ and optimal control $\hat{\vec{u}}^*(l-1)$ vectors, vectors corresponding to the differences between actually used and predicted production policy and cost vectors $\Delta\vec{u}(l-1)=\vec{u}(l-1)-\hat{\vec{u}}^*(l-1)$ and $\Delta\vec{d}(l-1)=\vec{d}(l-1)-\hat{\vec{d}}(l-1)$ respectively are computed. Then an a priori predicted state vector $\hat{\vec{x}}^-(l)$ (see equation (9)) and corresponding a priori state error covariance matrix $P^-(l)$ values are estimated using the discrete time Kalman filter's formulas of equation (5) and:

$$P^-(l)=\hat{A}(l-1)P^+(l-1)\hat{A}^T(l-1)+\hat{B}(l-1)R(\Delta \vec{u}(l-1))\hat{B}^T(l-1)++\hat{C}(l-1)R(\Delta\vec{d}(l-1))\hat{C}^T(l-1)+R(\vec{w}_x(l-1))+R(\vec{w}_d(l-1)), \quad (18)$$

where $P^+(l-1)$ is the a posteriori state vector's error's $(e^+(l-1)=\vec{x}(l-1)-\hat{\vec{x}}^+(l-1))$ covariance matrix computed during "l−1" period. $R(\Delta\vec{u}(l-1))$, $R(\Delta\vec{d}(l-1))$, $R(\vec{w}_x(l-1))$ and $R(\vec{w}_d(l-1))$ are the covariance matrices corresponding to the difference between actual and optimal control vectors, difference between actual and predicted cost vectors, a state and a cost vectors fluctuations respectively.

Furthermore, at the beginning of the "l"-th period the actual state $\vec{x}(l)$, observation $\vec{y}(l)$, fluctuations $\vec{w}_x(l)$ and $\vec{w}_y(l)$ are measured and corresponding fluctuations' covariance matrices $R(\vec{w}_x(l))$ and $R(\vec{w}_x(l))$ are computed. Next the updated dynamic $A(l-1)$, control $B(l-1)$, cost $C(l-1)$ and observations $H(l)$ matrices and corresponding predicted $\hat{A}(l)$, $\hat{B}(l)$, $\hat{C}(l)$ and $\hat{H}(l+1)$ matrices are calculated. A Kalman gain matrix $K(l)$ computed by minimizing a trace of the a posteriori covariance matrix as described in more detail in M. Gopal, "Modern Control System Theory," 2nd ed. (1993); and Robert Stengel, "Stochastic Optimal Control" (1986), each of which is incorporated by reference, as, $$K(l)=P^-(l)H^T(l)(H(l)P^-(l)H^T(l)+R(\vec{w}_y(l)))^{-1}. \quad (19)$$

As soon as the actual observation vector $\vec{y}(l)$ is measured, the a posteriori state vector $\hat{\vec{x}}^+(l)$ and corresponding covariance matrix $P^+(l)$ are computed as $$\hat{\vec{x}}^+(l)=\hat{\vec{x}}^-(l)+K(l)(\vec{y}(l)-H(l)\hat{\vec{x}}^-(l)) \quad (20)$$

$$P^+(l)=(I_n-K(l)H(l))P^-(l)(I_n-K(l)H(l))^T+K(l)R(\vec{w}_y(l))K^T(l) \quad (21)$$

Then all steps described above are repeated for the next ("l+1"-th) production cycle.

Since embodiments of the invention treat the enterprise's operation as a dynamic control system with feedback, a corresponding transfer function can be constructed for the entire enterprise and for every operational unit of the enterprise (e.g., department). Computational modeling of the transfer function facilitates analysis, automated prediction and management of the financial stability of the enterprise and each of its unit (department). As a result, at every period strong and weak sides of production and sales processes, strong and weak departments can be revealed.

Modeling the "Plant", "Market", "Expenses" and "Portfolio re-allocation" engines with linear digital filters, let cash flows $S_0(l)$, $S_1(l)$, $S_2(l)$, $S_3(l)$, $S_4(l)$ and $S'_4(l)$ be the discrete functions of time with the given time granularity $\Delta t=t_{l+1}-t_l$.

Figure 5:
FIG. 5 is a diagram illustrating a linear non-recursive digital filter that can be utilized according to certain embodiments.

According to one embodiment, a linear, non-recursive digital filter is utilized as illustrated in FIG. 5. Input and output cash flows (signals) for such a filter can be described as the time sequences $x_1 \ldots x_n$ and $y_1 \ldots y_n$. Let us assume that output depends on the input as:

$$y_k = \sum_{i=0}^{N} a_i x_{k-i}. \quad (22)$$

Thus, we have a "Nth-order" digital filter disregarding the delays in the filter, i.e. output signal appears at the same moment when input signal is applied. Let's also consider $t_k=k$ to be the end of the k-th time period. Only one input signal can be taken into account for the first time period $$t_0: y_0 = b_0 x_0, \text{ i.e. } b_0 = \frac{y_0}{x_0}.$$

For $t_1$ we have:

$$b_1 = \frac{y_1 - y_0}{x_1}.$$

For $$t_k: b_k = \frac{y_k - y_{k-1}}{x_k}.$$

From equation (22) we have: $a_i=b_{k-i}$. Therefore, if we have input and output time sequences, we can obtain the filter's coefficients. The filter's coefficients $a_i$ are the response functions: $a_i=h_i$. Since $S_0(t_1)$ is the input and $S_4(t_1)$ is the output "signals" of the Enterprise model, the Enterprise's transfer function $H(z(k))$ can be written as:

$$H_E(z(k)) = \frac{H_e(z(k))H_m(z(k))H_p(z(k))}{1 - H_e(z(k))H_m(z(k))H_p(z(k))}, \quad (23)$$

where $$H_p(z(k)) = \frac{S_2(z(k))}{S_1(z(k))}, \; H_m(z(k)) = \frac{S_3(z(k))}{S_2(z(k))}, \quad (24)$$

$$H_e(z(k)) = \frac{S_4(z(k))}{S_3(z(k))} \text{ and}$$

$$H_o(z(k)) = \frac{S'_4(z(k))}{S_4(z(k))} = 1$$

are the transfer functions of the "Plant", "Market", "Expenses" and "Portfolio re-allocation" engines respectively. $S_i(z(k))$, $i=1\ldots 4$ in equation (24) is the z-transform of the corresponding cash flow $S_i(t_k)$. Equation (22) can be re-written as $$y_k = \sum_{i=0}^{N} a_i x_{k-i} = \sum_{i=0}^{\infty} a_i x_{k-i}, \quad (25)$$

where $a_i=0$ for $i>N$. Using the definition and properties of z-transform we obtain from equation (25):

$$Y(z(k)) = \sum_{i=0}^{N} a_i X(z(k-i)) = \sum_{i=0}^{N} a_i z^{-i} X(z(k)), \quad (26)$$

i.e., the transfer function of the filter of equation (22) is equal to:

$$H(z(k)) = \frac{Y(z(k))}{X(z(k))} = \sum_{i=0}^{N} a_i z^{-i} = \sum_{i=0}^{N} h_i^{(A)} z^{-i}, \quad (27)$$

where z is the complex variable. Finite impulse response function $$h_i^{(A)} = b_{k-i} = \frac{y_{k-i} - y_{k-i-1}}{x_{k-i}}$$

can be expressed as a function of the input and output cash flows. Substituting equation (27) into equation (23) for each of the major enterprise components, "Plant", "Market", "Expenses" and "Portfolio re-allocation," we obtain the denominator of equation (23):

$$1 - H_e(z(k))H_m(z(k))H_p(z(k)) = 1 - \sum_{i=0}^{N_e(k)} \sum_{j=0}^{N_m(k)} \sum_{r=0}^{N_p(k)} h_i^{(e)} h_j^{(m)} h_r^{(e)} z^{-(i+j+r)}. \quad (28)$$

The dynamic control system, as described by transfer function of equation (23) will be stable if and only if all poles of the transfer function of equation (23) or all roots of the denominator of equation (23) will be located inside the unit circle with radius equal to one on the complex z-plane. The corresponding equation is:

$$1 - \sum_{i=0}^{N_e(k)} \sum_{j=0}^{N_m(k)} \sum_{r=0}^{N_p(k)} h_i^{(e)} h_j^{(m)} h_r^{(e)} z^{-(i+j+r)} = 0 \quad (29)$$

Multiplying left and right sides of equation (29) on $z^{(N_e(k)+N_m(k)+N_p(k))}$ we obtain:

$$z^{(N_e(k)+N_m(k)+N_p(k))} - \quad (30)$$

$$\sum_{i=0}^{N_e(k)} \sum_{j=0}^{N_m(k)} \sum_{r=0}^{N_p(k)} h_i^{(e)} h_j^{(m)} h_r^{(e)} z^{-(i+j+r)+(N_e(k)+N_m(k)+N_p(k))} = 0.$$

Equation (30) has $N_p(k)+N_m(k)+N_e(k)$ roots. If all of them are located inside the circle with radius equal to one then the system is stable and can operate normally under the influence of the external factors such as Enterprise-Market interaction.

The model presented above according to one embodiment considers an enterprise as a linear recursive filter with given orders of its non-recursive components ("Plant", "Market", "Expenses").

Figure 7:
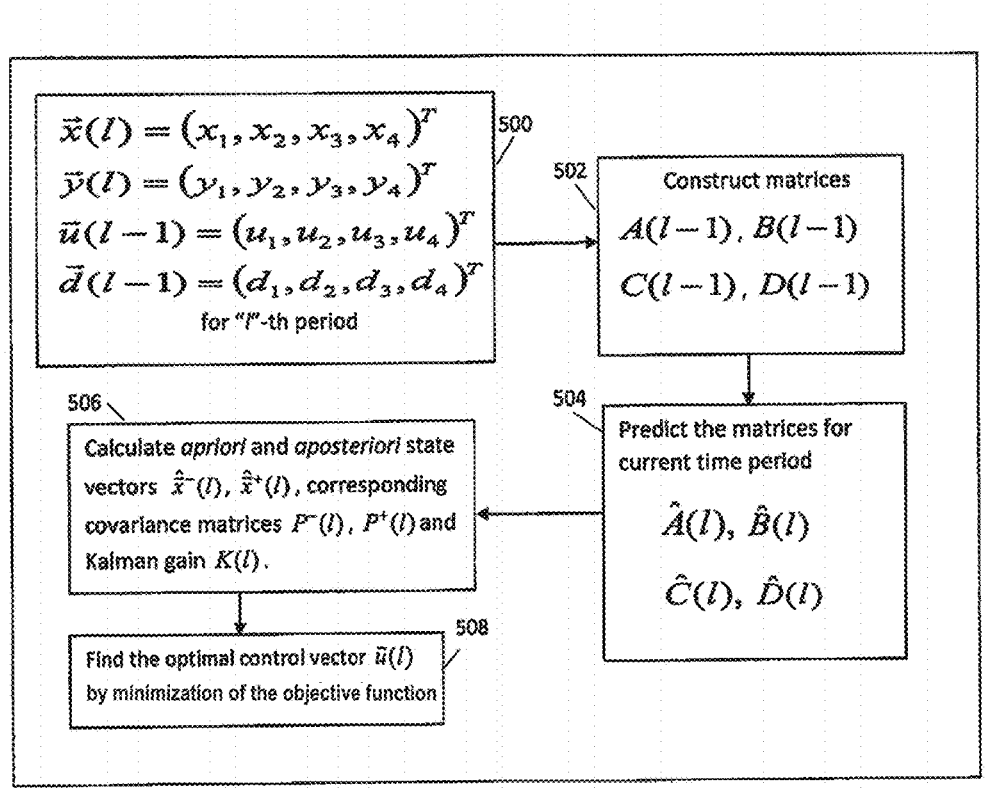
FIG. 7 is a block diagram illustrating the operation of an exemplary control system for an enterprise producing four product lines.

FIG. 7 is a flow diagram illustrating an example of the operation of a resource allocation system for an enterprise according to one embodiment. The enterprise depicted in FIG. 7 has a production portfolio of four components (n=m=p=4). The system shown in FIG. 7 is designed to maintain performance and stability of the enterprise by tracking the target ROI and computing a stability index. The system of FIG. 7 is a time-varying control system. The system shown in FIG. 7 produces outputs related to two main factors: (1) performance, measured by the ROI value; and (2) stability, measured by the Stability Index defined as the distance between the most remote enterprise's transfer function's pole and the origin on the complex plane.

At block 500, each of the state (revenue) $\vec{x}=(x_1,x_2,x_3,x_4)^T$, control (production portfolio optimal allocation) $\vec{u}=(u_1,u_2,u_3,u_4)^T$, observation $\vec{y}=(y_1,y_2,y_3,y_4)^T$ and cost $\vec{d}=(d_1,d_2,d_3,d_4)$ vectors are defined, and each of them contains four components corresponding to the production portfolio of the enterprise. In this embodiment n=4 and $$\sum_{i=1}^{n} u_i = 1. \quad (31)$$

Control vector $\vec{u}(l)$ can be treated as a quantitative representation of the production policy, i.e. optimal allocation of the capital invested into the production for the next "l+1" period. The goal according to one embodiment is to get policy components $\vec{u}(l)$ for the next production cycle that promote movement towards some policy goals, while maintaining enterprise operation within specific criteria, such as the enterprise's ROI (as the one of the enterprise's performance metric) and enterprise financial stability. The optimality conditions which should be satisfied are represented by the objective function J, and could be, for example, whole portfolio return and return per each product close to some desirable (target) ROI values and provided stability index value less than one. Optimal production policy is the solution of the equation (14) under satisfied condition (15).

At block 500 (FIG. 7), l is the current time period, l−1 is the previous period, l+1 is the next period. To obtain actual dynamic A(l−1), control B(l−1), cost C(l−1) and observation H(l) matrices we have actual revenue measured for L+1 consecutive periods. At block 502, the values of the matrix elements of A(l−1), B(l−1), C(l−1) and H(l) are updated with information from the previous time periods. In the embodiment shown in FIG. 5, there are two previous time measurements (i.e., L=2). Then the matrix X can be written as 4×2 matrix:

$$X(l) = [\vec{x}(l-L+1), \ldots \vec{x}(l)] = \begin{bmatrix} x_1(l-1) & x_1(l) \\ x_2(l-1) & x_2(l) \\ x_3(l-1) & x_3(l) \\ x_4(l-1) & x_4(l) \end{bmatrix} \quad (32)$$

and Z can be written as a (3n²×L=48×2) matrix:

$$Z(l-1) = \begin{bmatrix} \vec{x}(l-2) & \vec{x}(l-1) \\ \vec{u}(l-2) & \vec{u}(l-1) \\ \vec{d}(l-2) & \vec{d}(l-1) \end{bmatrix}. \quad (33)$$

The (48×1) vector $\vec{\vec{\beta}}$ previously defined can also be constructed:

$$\vec{\vec{\beta}}(l-1) = \text{vec}[A(l-1), B(l-1), C(l-1)] \quad (34)$$

As previously described, vectors obtained within "vec" procedure are indicated with double arrow above them. Fluctuation (4×2) matrices can be built as (see definition of equation (7) for L=2):

$W_x(l-1) = [\vec{w}_x(l-2), \vec{w}_x(l-1)]$—for a revenue uncertainty, $W_d(l-1) = [\vec{w}_d(l-2), \vec{w}_d(l-1)]$—for a cost uncertainty.

Dynamic, control, cost and observation matrices can be updated using expressions (16, 17) with L=2 and n=m=p=4.

At block 504 the predicted matrix elements of the matrices $\hat{A}(l), \hat{B}(l), \hat{C}(l)$ and $\hat{H}(l+1)$ for the current and next time periods are computed. In one embodiment, this step is applied in order to find a set of production policy components $\vec{u}(l)$. Forecasting for this example has been performed based on additive double exponential smoothing method (in a reality any appropriate forecasting method can be used):

$$a^{(i)}(l) = \alpha^{(i)} \lambda^{(i)}(l) + (1-\alpha^{(i)})(a^{(i)}(l-1)+b^{(i)}(l-1)), \quad (35)$$

$$b^{(i)}(l) = \eta^{(i)}(a^{(i)}(l)-a^{(i)}(l-1))+(1-\eta^{(i)})b^{(i)}(l-1), \text{ and} \quad (36)$$

$$\hat{f}^{(i)}(l+1) = a^{(i)}(l)b^{(i)}(l) \quad (37)$$

where $\lambda^{(i)}(l)$ is the i-th component of the vectors $\vec{\vec{\beta}}$ or $\vec{\vec{\gamma}}$. Note that forecast calculated during l−1-th period and denoted as $\hat{f}(l)$ will be "active" during l-th period. In other words, the forecast $\hat{f}^{(i)}(l)$ should be compared with actual value $f^{(i)}(l)$.

The forecasting procedure in this example uses two stages. During first stage we obtain the values of the parameters $\alpha^{(i)}$ and $\eta^{(i)}$ from the range [0 ... 1] providing the minimum of the i-th component of "Mean Absolute Error" (MAE):

$$MAE^{(i)}(l) = |\hat{f}^{(i)}(l) - f^{(i)}(l)|. \quad (38)$$

Recall that vector $\vec{\vec{\beta}}$ has 48 components and vector $\vec{\vec{\gamma}}$ has 16 components for considered 4-dimensional portfolio. During the second stage we apply the $\alpha^{(i)}(l)$ and $\eta^{(i)}(l)$ values found during first stage to the forecast $\hat{f}^{(i)}(l+1)$. Initial values are: $a^{(i)}(l_{min}) = \lambda^{(i)}(l_{min})$ and $b^{(i)}(l_{min}) = 0$.

At block 506, all remaining calculations required for the control vector estimation are performed. A discrete time-varying Kalman filter is used as an estimator embedded into the control system. All calculations include an estimation of the a priori and a posteriori state vectors their covariance matrices, covariance matrices of the state space (revenue), cost and observation (retained earnings) vectors' fluctuations and Kalman gain.

During the time period "l", before actual revenue $\vec{x}(l)$ and retained earnings $\vec{y}(l)$ are measured, the a priori state vector $\hat{\vec{x}}^-(l)$ and its covariance $P^-(l)$ are defined as:

$$\hat{\vec{x}}^- = \hat{A}(l-1)\hat{\vec{x}}^+(l-1)+\hat{B}(l-1)\vec{u}(l-1)+\hat{C}(l-1)\hat{d}(l-1); \quad (39)$$

$$P^-(l) = E[(\vec{x}(l)-\hat{\vec{x}}^-(l))(\vec{x}(l)-\hat{\vec{x}}^-(l))^T] = \text{cov}((\vec{x}(l)-\hat{\vec{x}}^-(l)),(\vec{x}(l)-\hat{\vec{x}}^-(l))^T). \quad (40)$$

Where there is insufficient historical data to generate these vectors, initial values can be used instead. For example, in the embodiment described with respect to FIG. 5, initial values $\hat{\vec{x}}^-(l) = \vec{x}(l_{min})$ and $P^-(l_{min}) = I_4$ are used.

As soon as actual "measured" values of the revenue (state vector and retained earnings (observation variable $\vec{y}$) become known, the system can estimate the dynamic, control and cost for previous period: A(l−1), B(l−1) and C(l−1). The observation matrix for the current period H(l), corresponding predictions $\hat{A}(l), \hat{B}(l), \hat{C}(l)$ and $\hat{H}(l+1)$ can also be determined. Thus, the a posteriori state vector is defined with respect to equation (20).

At block 508, the objective function J is "optimized," that is, the control inputs $\hat{u}_i(l)$ are adjusted to improve compliance with the criteria and constraints set in the objective function J while maintaining enterprise stability. There are set of the different "objective functions" that can be defined at the discretion of the enterprise. For this example the optimal production portfolio allocation weights (control inputs) $\hat{u}_i(l)$ were numerically found from minimization of the J-function:

$$\hat{J}(l+1) = \sum_{i=1}^{4} \left[ \frac{\left(\hat{H}(l+1)\hat{\vec{x}}^-(l+1)\right)_i}{\hat{u}_i(l)S_1(l+1)} - r_i(l+1) \right]^2 \quad (41)$$

Where $$\hat{\vec{x}}^-(l+1) = \hat{A}(l)\hat{\vec{x}}^+(l)+\hat{B}(l)\vec{u}(l)+\hat{C}(l)\vec{d}(l), \quad (42)$$

is the "a priori" state vector for the l+1-th period, $$S_1(l+1) = \sum_{i=1}^{4} d_i(l)$$

is the projected cost of production proportional to expected demand for the l+1-th period, $r_i(l+1)$ is the target (desired) return, $(\hat{H}(l-1)\hat{\vec{x}}^-(l+1))_i, \hat{u}_i(l)S_1(l+1)$ and $$\frac{\left(\hat{H}(l+1)\hat{\vec{x}}^-(l+1)\right)}{\hat{u}_i(l)S_1(l+1)}$$

are the estimated retained earnings, the cost and return expected for i-th product and l+1-th period respectively. Constraints taken into account are:

$$\sum_{i=1}^{4}\hat{u}_i(l) = 1 \tag{43}$$

(the sum of the reallocated resources should be equal to the enterprise's projected production cost) and $$0 < \hat{u}_i(l) < 1 \tag{44}$$

Cost proportional to demand, revenue, and retained earnings, are all measured in relative units and portfolio allocation for two first periods, for each of the four products are presented in Table 1. The values shown in Table 1 are illustrative only, and represent one example of an enterprise in which specified target returns are assigned to each of the four products. Other criteria can be used that would result in different values of stability index and returns.

TABLE 1

| time period | Cost | | | | Revenue | | | |
|---|---|---|---|---|---|---|---|---|
| | product 1 | product 2 | product 3 | product 4 | product 1 | product 2 | product 3 | product 4 |
| 1 | 30.13 | 21.12 | 20.15 | 29.11 | 60.26 | 42.24 | 40.29 | 58.22 |
| 2 | 30.24 | 21.21 | 20.25 | 29.22 | 60.47 | 42.43 | 40.51 | 58.43 |
| 3 | | | | | 60.67 | 42.62 | 40.65 | 58.61 |

| time period | Retained earnings | | | | Portfolio weight | | | |
|---|---|---|---|---|---|---|---|---|
| | product 1 | product 2 | product 3 | product 4 | product 1 | product 2 | product 3 | product 4 |
| 1 | 0.60 | 0.42 | 0.40 | 0.58 | 0.30 | 0.21 | 0.20 | 0.29 |
| 2 | 0.60 | 0.42 | 0.41 | 0.58 | 0.21 | 0.20 | 0.30 | 0.29 |

Example: Let's consider the Enterprise with cash flows $S_0(l)$, $S_1(l)$, $S_2(l)$, $S_3(l)$ and $S_4(l)$ (please note that $S'_4(l)=S_4(l)$ and $S_1(l)=S_0(l)+S'_4(l)$), see Table 2. Let $N_p(l)=N_m(l)=N_e(l)=4$, i.e. transfer function has twelve poles. The enterprise is financially stable during period l if all twelve poles are inside the unit circle. The poles can be moved on the complex z-plane changing the cash flow values. Each pole has own trajectory on the z-plane, and as soon as the system has collected enough consecutive pole's positions it can predict their future position. Partial trajectory of the 4$^{th}$ root (or 4$^{th}$ transfer function's pole) on the z-plane is presented in FIG. 6 using polar coordinates.

TABLE 2

Illustrative Example of cash flows values for consecutive time periods

| Period $t_l$ | $S_0(l)$ | $S_1(l)$ | $S_2(l)$ | $S_4(l)$ | $S_4'(l)$ |
|---|---|---|---|---|---|
| 1 | 1.0000 | 2.1000 | 1.8000 | 1.6000 | 1.1000 |
| 2 | 0.9983 | 2.1082 | 1.7911 | 1.6819 | 1.1099 |
| 3 | 0.9945 | 2.1058 | 1.7940 | 1.7672 | 1.1113 |
| 4 | 0.9900 | 2.0252 | 1.7894 | 1.7257 | 1.0351 |
| 5 | 0.9823 | 1.9590 | 1.7957 | 1.7875 | 0.9767 |
| 6 | 0.9804 | 1.9900 | 1.7986 | 1.8168 | 1.0096 |
| 7 | 0.9728 | 1.9342 | 1.7980 | 1.8319 | 0.9614 |
| 8 | 0.9683 | 1.8574 | 1.8069 | 1.9201 | 0.8891 |
| 9 | 0.9651 | 1.9399 | 1.8140 | 1.8958 | 0.9748 |
| 10 | 0.9618 | 1.9877 | 1.8154 | 1.8905 | 1.0259 |
| 11 | 0.9527 | 1.9717 | 1.8148 | 1.9502 | 1.0190 |
| 12 | 0.9476 | 1.9614 | 1.8165 | 1.9552 | 1.0138 |
| 13 | 0.9412 | 2.0058 | 1.8245 | 1.9351 | 1.0646 |
| 14 | 0.9340 | 2.0919 | 1.8309 | 1.9547 | 1.1579 |
| 15 | 0.9256 | 2.0131 | 1.8212 | 1.9961 | 1.0875 |
| 16 | 0.9170 | 1.9335 | 1.8132 | 2.0635 | 1.0166 |
| 17 | 0.9147 | 1.9064 | 1.8161 | 2.0557 | 0.9917 |
| 18 | 0.9085 | 1.8126 | 1.8171 | 1.9803 | 0.9041 |
| 19 | 0.8992 | 1.8487 | 1.8227 | 1.9735 | 0.9495 |
| 20 | 0.8977 | 1.9040 | 1.8288 | 1.9862 | 1.0063 |
| 21 | 0.8884 | 1.9208 | 1.8246 | 2.0705 | 1.0324 |
| 22 | 0.8866 | 1.9245 | 1.8260 | 2.0621 | 1.0378 |
| 23 | 0.8776 | 1.9030 | 1.8164 | 2.0579 | 1.0254 |
| 24 | 0.8743 | 1.8378 | 1.8100 | 2.1450 | 0.9635 |
| 25 | 0.8724 | 1.7948 | 1.8096 | 2.1633 | 0.9223 |
| 26 | 0.8687 | 1.8505 | 1.8028 | 2.1980 | 0.9818 |
| 27 | 0.8672 | 1.8512 | 1.8033 | 2.1571 | 0.9840 |
| 28 | 0.8590 | 1.8587 | 1.8039 | 2.2547 | 0.9997 |
| 29 | 0.8534 | 1.7790 | 1.8070 | 2.2908 | 0.9256 |
| 30 | 0.8507 | 1.6820 | 1.8091 | 2.2896 | 0.8313 |

The position of every pole, say $z_4$ is described by pair $(\theta_4, |\vec{z}_4|)$, where the angle $$\theta_4 = \arctan\left(\frac{Im(z_4)}{Re(z_4)}\right) \tag{45}$$

between the x-axis to the radius vector $\vec{z}_4$ specified in radians and by length of the radius vector $\vec{z}_4$:

$$|\vec{z}_4| = \sqrt{Re^2(z_4) + Im^2(z_4)}, \tag{46}$$

where $Re(z_4)$ and $Im(z_4)$ are the real and imaginary parts of the complex value $z_4$. Accordingly, consecutive positions of the $4^{th}$ pole are: (0.01, 0.03), (0.29, 0.31), (0.62, 0.57), (0.88, 0.91), (1.22, 1.11), (1.34, 1.12), (1.51, 0.59). Following the Statistical Process Control methodology, the "Stable" state (with poles falling inside the unit circle) can be divided into "Normal" zone located, say, between center of the circle (0,0) and $|\vec{z}_4|=0.8$, "Warning" zone between $|\vec{z}_4|=0.8$ and $|\vec{z}_4|=0.9$ and "Alarm" zone between $|\vec{z}_4|=0.9$ and $|\vec{z}_4|=1.0$. If $|\vec{z}_4|>1.0$ the system is unstable. As we can see our "enterprise" is in the "Normal" state during periods 1 ($|\vec{z}_4|=0.03$), 2 ($|\vec{z}_4|=0.31$) and 3 ($|\vec{z}_4|=0.57$). During period 4 ($|\vec{z}_4|=0.91$) the "enterprise" is in the "Alarm" zone, during $5^{th}$ ($|\vec{z}_4|=1.11$) and $6^{th}$ ($|\vec{z}_4|=1.12$) periods it is in the "unstable" state, and during the $7^{th}$ period after changing available investment value from $S_0(t_6)=0.9804$ to $S_0(t_7)=0.9728$ the "enterprise" is moved back into the "Normal" zone: $|\vec{z}_4|=0.59$.

The results of the tracking target returns for simulated company producing four products during 60 time periods are presented in FIGS. 8A-8E. As indicated, a first line (dashed) represents a desired (target) return. A second line (solid) represents the predicted return calculated during given time period for the next one. The two lines together represent the ability of the model to follow the target return. All calculations were done based on four cash flows mentioned above. These cash flows were created using a random number generator. Changes of the portfolio components were performed by the policy optimization.

In the present illustrative example, as soon as the cost for the next "l+1" production cycle is updated, actual revenue is estimated. The simple relationship: $x_i(l+1)=2*d_i(l+1)$ was selected. Retained earnings were modeled as: $y_i(l+1)=x_i(l+1)/100$. After these estimations the next production cycle "l+1" is started. In practice, actual values of the cost, revenue and retained earnings can be measured.

The production portfolio weights, predicted returns and target (desired) returns by product calculated according to one embodiment are presented in the Table 2 and FIGS. 8A-8D. As can be seen in Table 2, the target returns are modified multiple times. Larger changes in target return correspond to the larger fluctuations in the predicted returns, and greater difference between predicted and target returns.

TABLE 2

| Time period | Production portfolio weights | | | | Predicted (left) and desired (right) returns [in %] by product | | | | | | | |
|---|---|---|---|---|---|---|---|---|---|---|---|---|
| | product 1 | product 2 | product 3 | product 4 | product 1 | | product 2 | | product 3 | | product 4 | |
| 1 | 0.00 | 0.00 | 0.00 | 0.00 | 0.00 | 0.00 | 0.00 | 0.00 | 0.00 | 0.00 | 0.00 | 0.00 |
| 2 | 0.00 | 0.00 | 0.00 | 0.00 | 0.00 | 0.00 | 0.00 | 0.00 | 0.00 | 0.00 | 0.00 | 0.00 |
| 3 | 0.12 | 0.10 | 0.68 | 0.10 | 5.01 | 5.00 | 4.22 | 6.20 | 0.59 | 4.30 | 5.80 | 7.80 |
| 4 | 0.12 | 0.10 | 0.10 | 0.68 | 5.59 | 5.00 | 4.71 | 6.20 | 2.40 | 4.30 | −1.43 | 7.80 |
| 5 | 0.10 | 0.10 | 0.60 | 0.20 | 5.35 | 5.00 | 6.36 | 6.20 | 0.45 | 4.30 | 7.43 | 7.80 |
| 6 | 0.60 | 0.10 | 0.20 | 0.10 | 2.84 | 1.00 | 0.07 | 2.00 | 1.75 | 1.00 | 1.34 | 1.60 |
| 7 | 0.28 | 0.32 | 0.18 | 0.22 | 6.05 | 1.00 | 6.96 | 2.00 | −3.56 | 1.00 | 5.15 | 1.60 |
| 8 | 0.36 | 0.14 | 0.32 | 0.18 | 3.04 | 1.00 | 2.68 | 2.00 | 2.92 | 1.00 | −1.15 | 1.60 |
| 9 | 0.34 | 0.10 | 0.26 | 0.30 | 1.90 | 1.00 | 2.26 | 2.00 | 1.73 | 1.00 | 2.40 | 1.60 |
| 10 | 0.36 | 0.32 | 0.10 | 0.22 | 3.21 | 1.00 | 3.57 | 2.00 | 0.69 | 1.00 | 3.20 | 1.60 |
| 11 | 0.46 | 0.28 | 0.16 | 0.10 | 2.71 | 1.00 | 3.02 | 2.00 | 1.79 | 1.00 | 0.61 | 1.60 |
| 12 | 0.12 | 0.12 | 0.36 | 0.40 | 0.98 | 1.00 | 1.84 | 2.00 | 1.07 | 1.00 | 1.67 | 1.60 |
| 13 | 0.58 | 0.16 | 0.10 | 0.16 | 2.50 | 1.00 | 2.49 | 2.00 | 0.72 | 1.00 | 2.15 | 1.60 |
| 14 | 0.12 | 0.66 | 0.10 | 0.12 | 5.07 | 5.50 | 0.14 | 6.40 | 3.62 | 4.40 | 6.58 | 6.80 |
| 15 | 0.18 | 0.26 | 0.46 | 0.10 | 6.00 | 5.50 | 6.60 | 6.40 | −0.37 | 4.40 | 5.87 | 6.80 |
| 16 | 0.18 | 0.10 | 0.62 | 0.10 | 5.77 | 5.50 | 1.73 | 6.40 | −0.08 | 4.40 | 6.36 | 6.80 |
| 17 | 0.14 | 0.10 | 0.64 | 0.12 | 5.65 | 5.50 | 5.37 | 6.40 | 0.70 | 4.40 | 6.78 | 6.80 |
| 18 | 0.14 | 0.10 | 0.62 | 0.14 | 5.62 | 5.50 | 5.62 | 6.40 | 0.80 | 4.40 | 7.08 | 6.80 |
| 19 | 0.16 | 0.10 | 0.56 | 0.18 | 5.10 | 5.50 | 5.93 | 6.40 | 1.28 | 4.40 | 6.63 | 6.80 |
| 20 | 0.14 | 0.10 | 0.62 | 0.14 | 5.62 | 5.50 | 5.16 | 6.40 | 0.96 | 4.40 | 6.48 | 6.80 |
| 21 | 0.16 | 0.10 | 0.56 | 0.18 | 5.42 | 5.50 | 5.39 | 6.40 | 1.07 | 4.40 | 6.84 | 6.80 |
| 22 | 0.16 | 0.10 | 0.60 | 0.14 | 5.03 | 5.50 | 5.17 | 6.40 | 1.02 | 4.40 | 6.60 | 6.80 |
| 23 | 0.16 | 0.10 | 0.54 | 0.20 | 5.27 | 5.50 | 5.68 | 6.40 | 1.25 | 4.40 | 6.55 | 6.80 |
| 24 | 0.18 | 0.10 | 0.62 | 0.10 | 4.45 | 4.50 | 4.94 | 9.50 | 0.98 | 3.00 | 8.00 | 12.00 |
| 25 | 0.18 | 0.10 | 0.56 | 0.16 | 4.33 | 4.50 | 6.28 | 9.50 | 1.50 | 3.00 | 11.42 | 12.00 |
| 26 | 0.18 | 0.10 | 0.62 | 0.10 | 4.29 | 4.50 | 5.37 | 9.50 | 0.92 | 3.00 | 8.90 | 12.00 |
| 27 | 0.18 | 0.10 | 0.62 | 0.10 | 3.93 | 4.50 | 5.93 | 9.50 | 0.98 | 3.00 | 12.66 | 12.00 |
| 28 | 0.20 | 0.16 | 0.42 | 0.22 | 5.15 | 4.50 | 9.13 | 9.50 | 4.46 | 3.00 | 12.56 | 12.00 |
| 29 | 0.20 | 0.10 | 0.60 | 0.10 | 4.31 | 4.50 | 4.97 | 9.50 | 0.88 | 3.00 | 7.19 | 12.00 |
| 30 | 0.14 | 0.10 | 0.52 | 0.24 | 4.94 | 5.00 | 6.51 | 6.20 | 1.75 | 4.30 | 7.71 | 7.80 |
| 31 | 0.18 | 0.10 | 0.62 | 0.10 | 5.04 | 5.00 | 4.26 | 6.20 | 0.81 | 4.30 | 5.81 | 7.80 |
| 32 | 0.16 | 0.10 | 0.42 | 0.32 | 5.92 | 5.00 | 3.32 | 6.20 | −1.43 | 4.30 | −0.75 | 7.80 |
| 33 | 0.22 | 0.10 | 0.58 | 0.10 | 4.65 | 5.00 | 3.60 | 6.20 | 1.05 | 4.30 | 3.35 | 7.80 |
| 34 | 0.16 | 0.10 | 0.60 | 0.14 | 5.18 | 5.00 | 3.51 | 6.20 | −0.37 | 4.30 | 7.60 | 7.80 |
| 35 | 0.16 | 0.10 | 0.62 | 0.12 | 5.08 | 5.00 | 5.16 | 6.20 | 0.78 | 4.30 | 7.45 | 7.80 |
| 36 | 0.24 | 0.20 | 0.22 | 0.34 | 3.61 | 1.00 | 3.63 | 2.00 | 3.52 | 1.00 | 4.29 | 1.60 |
| 37 | 0.26 | 0.24 | 0.10 | 0.40 | 2.40 | 1.00 | 3.11 | 2.00 | 1.49 | 1.00 | 3.45 | 1.60 |
| 38 | 0.34 | 0.22 | 0.10 | 0.34 | 2.00 | 1.00 | 2.60 | 2.00 | 0.98 | 1.00 | 2.44 | 1.60 |
| 39 | 0.40 | 0.18 | 0.14 | 0.28 | 2.77 | 1.00 | 2.61 | 2.00 | −0.86 | 1.00 | 2.79 | 1.60 |
| 40 | 0.34 | 0.24 | 0.22 | 0.20 | 3.69 | 1.00 | 4.08 | 2.00 | −2.18 | 1.00 | 3.21 | 1.60 |
| 41 | 0.34 | 0.30 | 0.18 | 0.18 | 5.07 | 1.00 | 5.47 | 2.00 | −2.71 | 1.00 | 4.06 | 1.60 |
| 42 | 0.58 | 0.22 | 0.10 | 0.10 | 2.28 | 1.00 | 2.45 | 2.00 | 0.17 | 1.00 | 1.69 | 1.60 |
| 43 | 0.34 | 0.10 | 0.22 | 0.34 | 1.80 | 1.00 | 1.45 | 2.00 | 1.68 | 1.00 | 2.25 | 1.60 |
| 44 | 0.18 | 0.26 | 0.46 | 0.10 | 4.55 | 5.50 | 7.34 | 6.40 | −1.04 | 4.40 | 5.58 | 6.80 |
| 45 | 0.60 | 0.20 | 0.10 | 0.10 | −0.66 | 5.50 | 6.33 | 6.40 | 1.02 | 4.40 | 5.15 | 6.80 |

TABLE 2-continued

| Time period | Production portfolio weights | | | | Predicted (left) and desired (right) returns [in %] by product | | | | | | | |
|---|---|---|---|---|---|---|---|---|---|---|---|---|
| | product 1 | product 2 | product 3 | product 4 | product 1 | | product 2 | | product 3 | | product 4 | |
| 46 | 0.22 | 0.10 | 0.58 | 0.10 | 6.38 | 5.50 | 5.44 | 6.40 | −0.10 | 4.40 | 5.49 | 6.80 |
| 47 | 0.52 | 0.14 | 0.20 | 0.14 | −0.56 | 5.50 | 6.17 | 6.40 | 4.88 | 4.40 | −0.12 | 6.80 |
| 48 | 0.22 | 0.12 | 0.54 | 0.12 | 5.57 | 5.50 | 6.42 | 6.40 | 0.08 | 4.40 | 6.21 | 6.80 |
| 49 | 0.10 | 0.12 | 0.62 | 0.16 | 1.62 | 5.50 | 5.99 | 6.40 | 1.58 | 4.40 | 6.46 | 6.80 |
| 50 | 0.16 | 0.10 | 0.62 | 0.12 | 5.46 | 5.50 | 4.64 | 6.40 | 0.54 | 4.40 | 6.53 | 6.80 |
| 51 | 0.16 | 0.10 | 0.52 | 0.22 | 5.25 | 5.50 | 5.92 | 6.40 | 1.34 | 4.40 | 6.57 | 6.80 |
| 52 | 0.18 | 0.10 | 0.62 | 0.10 | 4.67 | 5.50 | 4.79 | 6.40 | 1.00 | 4.40 | 6.99 | 6.80 |

Figure 8A:
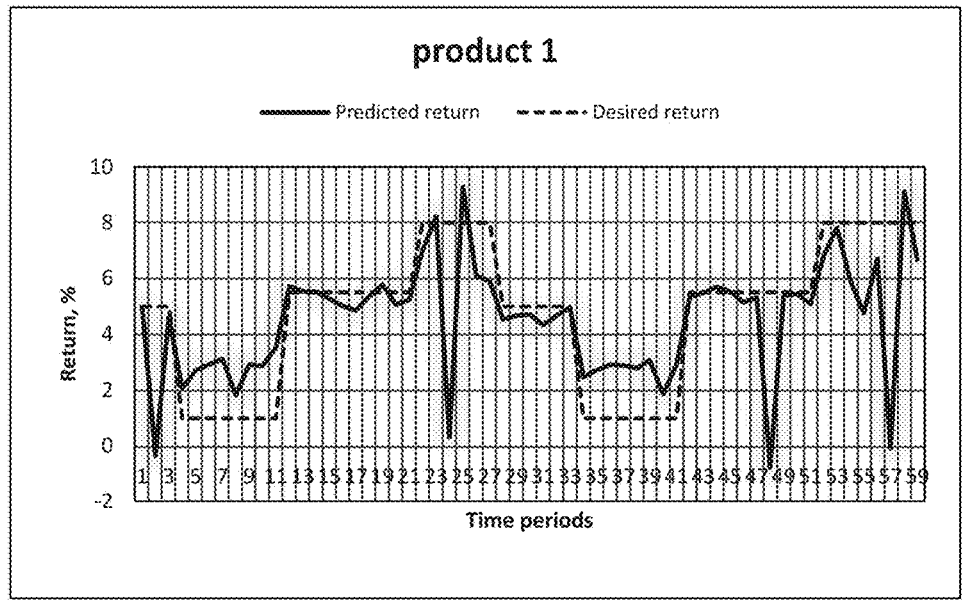
FIGS. 8A-8D illustrate predicted and actual returns for each of the four products of the example operation illustrated in FIG. 7.
Figure 8B:
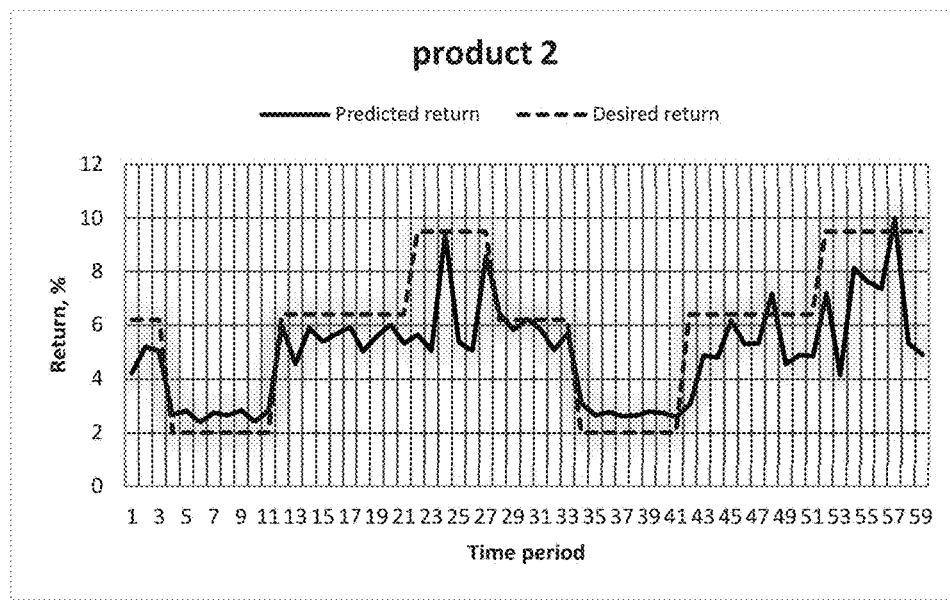
Figure 8C:
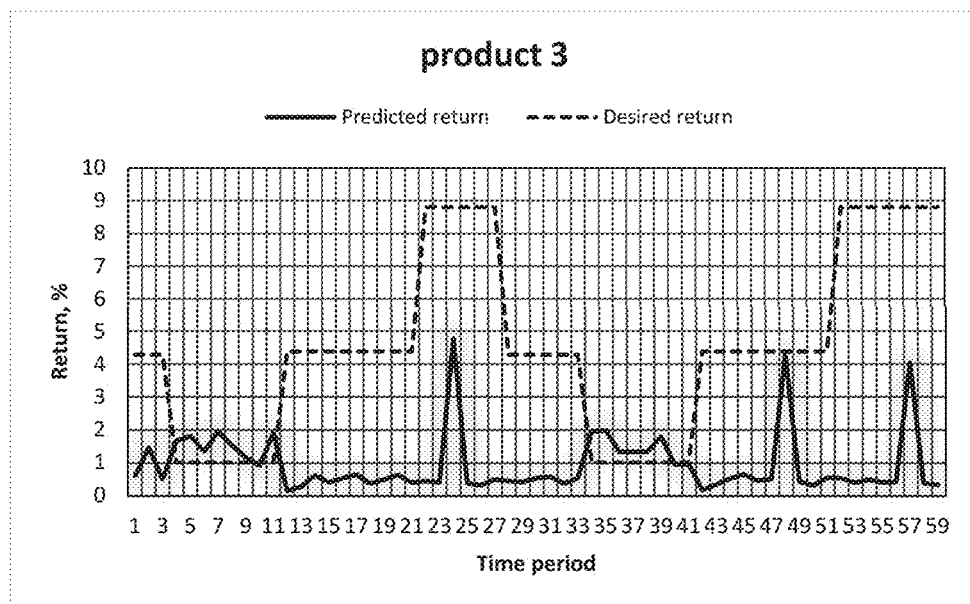
Figure 8D:
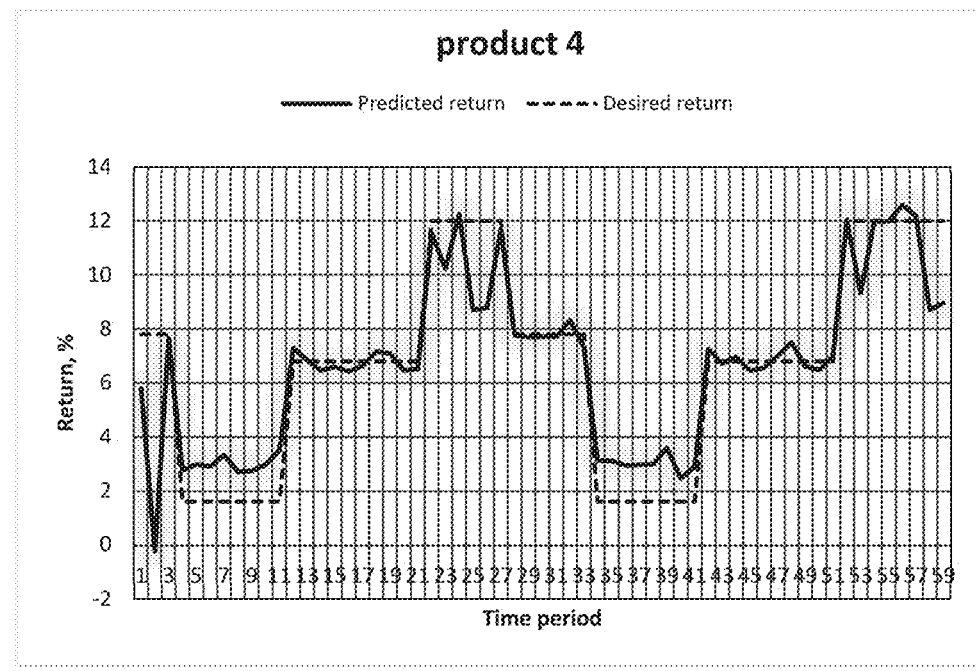
Figure 8E:
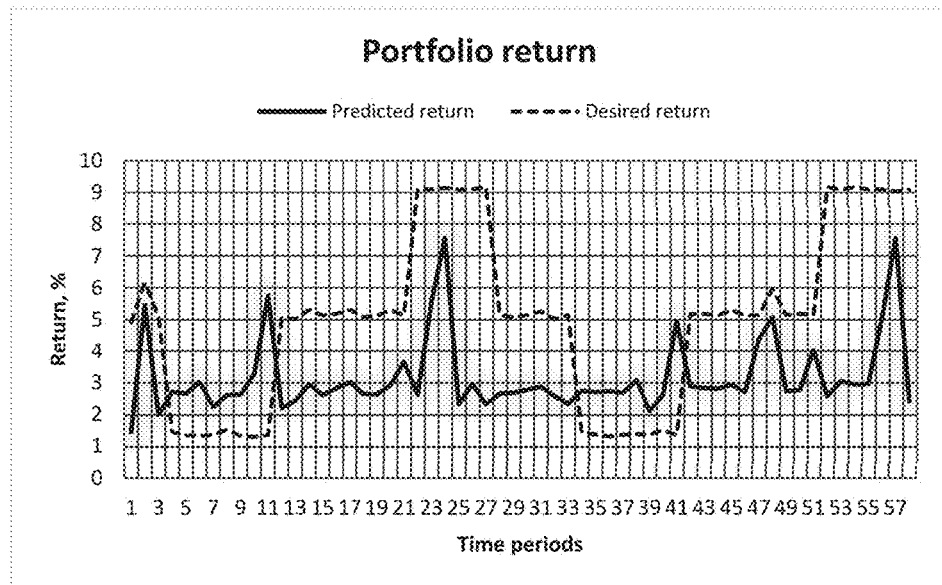
FIG. 8E illustrates the enterprise production portfolio return for the enterprise of FIG. 7.

The portfolio return is estimated as $$R(l+1) = \sum_{i=1}^{4} r_i(l+1) * u_i(l),$$

and is presented in FIG. 8e.

Stability of the analyzed system can be estimated by constructing the transfer function of the system. A dynamic control system, described by this transfer function, will be stable if and only if all poles of this transfer function are located inside the unit circle on the complex z-plane. Financial flows forming the transfer function can be expressed as the functions of the cost $S_1(l)$, expected $S_2(l)$ and actual $S_3(l)$ revenue and retained earning $S_4(l)$:

$$S_1(l) = \sum_{i=1}^{4} d_i(l), S_2(l) = \sum_{i=1}^{4} \hat{x}_i^-(l), S_3(l) = \sum_{i=1}^{4} x_i(l), S_4(l) = \sum_{i=1}^{4} \hat{y}_i^-(l). \quad (47)$$

Each of three system's engines: "Plant", "Market" and "Expenses" can be modeled as non-recursive linear filters of the n-th (n=3 for considered example) order. Thus, the transfer function has nine poles for each time period.

Figure 8F:
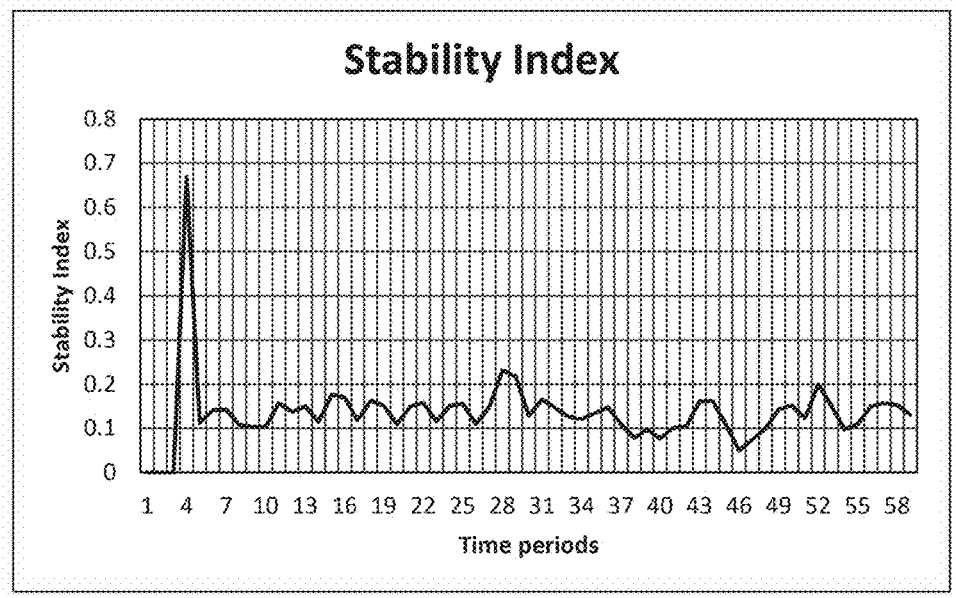
FIG. 8F illustrates the stability index of the enterprise of FIG. 7.

The distance between origin on the complex z-plane and the most distant transfer function's pole for "l"-th period is called the "Stability Indicator" SI(l). If SI(l)<1 then system is stable during period "l", and it is unstable otherwise (SI(l)>1). The time dependency of the Enterprise's financial stability is presented graphically at FIG. 8f. Because SI<1 at all "l", the enterprise of FIG. 7 was stable throughout the all considered time periods.

Figure 9:
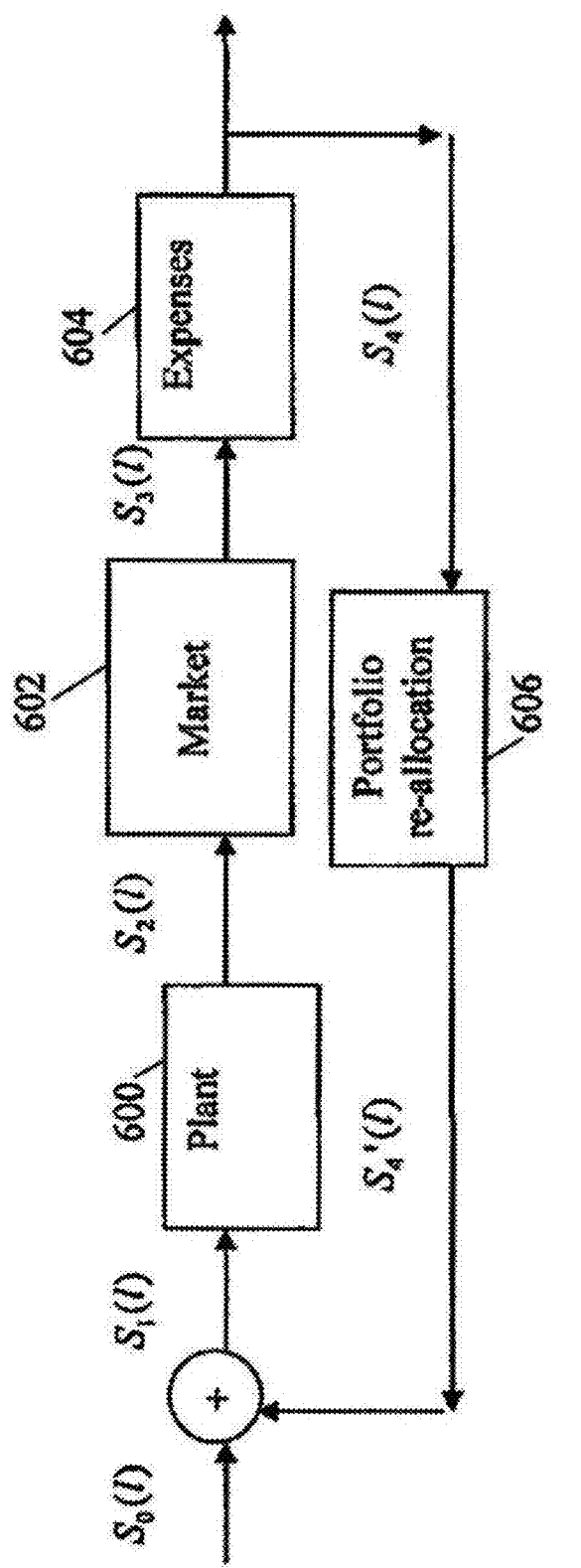
FIG. 9 is a system diagram depicting a control loop for the enterprise of FIG. 2 according to one embodiment.

FIG. 9 is a system diagram of the control system for the embodiment previously described with respect to FIG. 2. As shown in FIG. 9, an input investment $S_1(l) = S_0(l) + S'_4(l)$ is added to the system, which is routed to plant 600. $S_0(l)$ is the external investment (e.g. bank's loan) and $S'_4(l)$ is the total retained earnings invested back into production during period "l". As previously described, plant 600 is used to manufacture four types of products in this embodiment. In other embodiments, plants can produce more or fewer products.

The output of plant 600, $S_2(l)$ which is the revenue expected to be received from the markets 602. There can be one or many markets where the products are sold, as previously described with respect to Equation 1, above. The output of the markets 602, the actual total revenue $S_3(l)$, is a sum of the revenues derived from each product and each market. This output $S_3(l)$ is reduced by expenses 604. Expenses 604 can be allocated amongst the products, or can be subtracted from a revenue $S_3(l)$.

At this stage, sufficient data exists regarding actual production, actual revenue, and actual costs to re-allocate resources. The estimated costs, revenues, and expenses can be compared to the actual values, and a difference between them can be generated as previously described with respect to FIG. 7. Furthermore, a priori and a posteriori state vectors, their covariance matrices and covariance matrices of the state space, cost and retained earnings vectors' fluctuations can be generated and used for the optimal control vector calculation, as previously described with respect to FIGS. 2 and 7.

Figure 6:
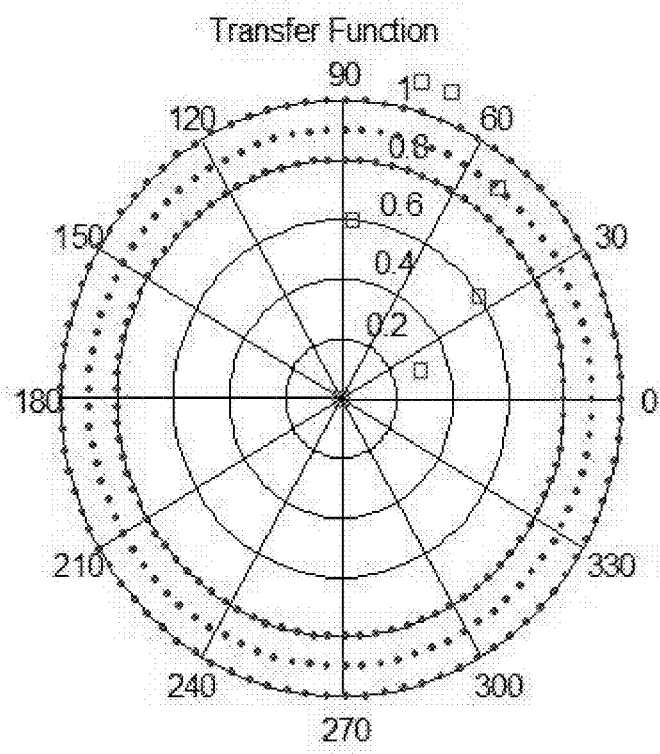
FIG. 6 is a diagram illustrating partial trajectory of a pole of a transfer function according to an illustrative example.

From these data, a portfolio reallocation 606 is generated that allocates the retained earnings $S_4(l)$ amongst the four product lines. This reallocated retained earnings $S'_4(l)$ is apportioned amongst the products at plant 600 during next time period. As shown in FIG. 6, each of $S_0(l)$, $S_1(l)$, $S_2(l)$, $S_3(l)$, $S_4(l)$, and $S'_4(l)$ are time-dependent. As such, the whole system makes a "one period step ahead" prediction during every time period, updating the state space, control, cost and retained earning vectors, and state transition, control, cost and observation matrices, by minimizing the deviations estimations from the actual values and updating the optimal production policy components to accomplish both enterprise stability and desired goals as reflected in the objective function construction.

The systems described herein are usable to operate a variety of applications that are useful for modeling behavior of an enterprise considered as a time-varying control system. For example, investment portfolio allocation can be monitored and automatically updated in case of generation of the "Buy" or "Sell" events. These events will be generated based on portfolio-market interaction and utilized strategy.

Further, utilizing the described methods and systems can optimize cloud computing system resources. For example, "Quality of Service" (QoS) parameters such as response time (delay), CPU utilization, profit in a Service Level Agreement (SLA) can be used as inputs to an enterprise control system.

In yet another embodiment, a course of disease-rehabilitation can be dynamically tracked, by monitoring a patient's parameters with automatic generation of the recommendations and "Warning" and "Alarm" signals when at least one of the parameters running out of the specified "Normal" state boundaries.

In various embodiments, dynamic stability control can be used to ascertain the effect on a dynamic enterprise or system by providing a goal (via either a objective function J or an analog to it in some other context) and modeling "what if" this goal was to be implemented. In addition for each of the mentioned above monitored and controlled system the "What if . . . " engine can be incorporated to provide the opportunity of the independent scenario simulation and analysis. For example, what if an Enterprise will change its products sales volumes allocation or what if a "Cloud" will change its servers' geographical locations.

Also every component of an enterprise's financial statement can be treated as a state vector component and can be predicted during a priori stage as a result of the suggested method application to an Enterprise or computed based on given cash flow analysis. Since suggested methodology allowed re-erect state transition, cost, control and observation matrices based on known actual state space, cost, control and output vectors the prediction error can be made less than predefined threshold under accordingly reduced time step.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A system for controlling an enterprise that produces a plurality of products by at least one production process, the system comprising:
    computing hardware, including at least one processor, data storage, and input/output facilities operatively coupled to the at least one production process of the enterprise, the data storage containing instructions that, when executed by the at least one processor, cause the computing hardware to implement:
    a main processing engine configured to generate a control vector corresponding to a target allocation of resources between the plurality of products to be produced by the enterprise, the control vector being applied to adjust operation of the at least one production process for each of the products;
    an actual revenue measurement engine configured to obtain data representing actual revenue generated by sales of each of the plurality of products in a market during a first time period;
    an actual cost measurement engine configured to obtain data representing actual cost attributed to each of the plurality of products during the first time period;
    a retained earnings computation engine configured to produce an observation vector containing elements in a data structure representing actual retained earnings attributed to each of the plurality of products during the first time period, the actual retained earnings being based on the data representing the actual revenue and on the data representing the actual cost;
    a matrix generator engine configured to generate a dynamic matrix, a control matrix, a cost matrix, and an observation matrix, wherein:
    the dynamic matrix contains elements arranged in a data structure that represents a dynamic relationship between a current set of revenue values and a predicted set of revenue values at a second time period subsequent to the first time period;
    the control matrix contains elements arranged in a data structure that represents a dynamic relationship between the control vector and the actual revenue corresponding to each product depending on the control vector;
    the cost matrix contains elements arranged in a data structure that represents a dynamic relationship between variations in the market and actual revenue corresponding to each product depending on the variations in the market;
    the observation matrix contains elements arranged in a data structure that represents a dynamic relationship between the actual revenue corresponding to each product and the actual retained earnings;
    the system further comprising an estimator engine configured to revise the dynamic matrix, the control matrix, the cost matrix, and the observation matrix for the second time period to produce predicted values for each corresponding matrix, the predicted values being based on corresponding historical values from at least one prior time period, wherein a degree of accuracy of the predicted values and computational loading of the computing hardware in implementation of the estimator engine increase with an increase in quantity of the at least one prior time period, and wherein the quantity of the at least one prior time period is limited in accordance with a desired level of accuracy of the predicted values.

2. The system of claim 1, wherein the control vector comprises a vector having a number of elements equal to a quantity of the plurality of products.

3. The system of claim 2, wherein a sum of elements that make up the control vector is equal to one.

4. The system of claim 1, wherein the estimator engine is configured to apply a set of forecasting algorithms to each of the vectorized dynamic, control, cost, and observation matrices, each forecasting algorithm being associated with a set of prediction errors, and wherein the estimator engine further selects one of the set of forecasting algorithms that is associated with a first prediction error that is smaller than the others of the set of prediction errors.

5. The system of claim 4, wherein predictions of each of the vectorized dynamic, control, cost, and observation matrices are generated using exponential smoothing.

6. The system of claim 4, wherein predictions of each of the vectorized dynamic, control, cost, and observation matrices are generated using a Holt-Winters method.

7. The system of claim 1, wherein the control vector is generated such that an objective function is minimized.

8. The system of claim 1, wherein the control vector is generated by applying stabilization criteria to stabilize revenues for each of the products over a series of time periods.

9. The system of claim 1, wherein the dynamic matrix is estimated based on an application of an analytical relationship between projected dynamic matrix values and measured historical values following from a dynamic equation with linear control and cost laws.

10. A method for controlling an enterprise that produces a plurality of products by at least one production process, the method comprising:
  generating, by a computing system, a control vector corresponding to a target allocation of resources between the plurality of products to be produced by the enterprise, the control vector being applied to adjust operation of the at least one production process for each of the products;
  obtaining, by the computing system, data representing actual revenue generated by sales of each of the plurality of products in a market during a first time period;
  obtaining, by the computing system, data representing actual cost attributed to each of the plurality of products during the first time period;
  producing, by the computing system, an observation vector containing elements in a data structure representing actual retained earnings attributed to each of the plurality of products during the first time period, the actual retained earnings being based on the data representing the actual revenue and on the data representing the actual cost;
  generating, by the computing system, a dynamic matrix, a control matrix, a cost matrix, and an observation matrix, wherein:
  the dynamic matrix contains elements arranged in a data structure that represents a dynamic relationship between a current set of revenue values and a predicted set of revenue values at a second time period subsequent to the first time period;
  the control matrix contains elements arranged in a data structure that represents a dynamic relationship between the control vector and the actual revenue corresponding to each product depending on the control vector;
  the cost matrix contains elements arranged in a data structure that represents a dynamic relationship between variations in the market and actual revenue corresponding to each product depending on the variations in the market;
  the observation matrix contains elements arranged in a data structure that represents a dynamic relationship between the actual revenue corresponding to each product and the actual retained earnings;
  the method further comprising revising, by the computing system, the dynamic matrix, the control matrix, the cost matrix, and the observation matrix for the second time period to produce predicted values for each corresponding matrix, the predicted values being based on corresponding historical values from at least one prior time period, wherein a degree of accuracy of the predicted values and computational loading of the computing system in revising the dynamic matrix, the control matrix, the cost matrix, and the observation matrix for the second time period increase with an increase in quantity of the at least one prior time period, and wherein the quantity of the at least one prior time period is limited in accordance with a desired level of accuracy of the predicted values.

11. The method of claim 10, wherein the control vector comprises a vector having a number of elements equal to a quantity of the plurality of products.

12. The method of claim 11, wherein a sum of elements that make up the control vector is equal to one.

13. The method of claim 10, in the revising, the computer system applies a plurality of forecasting algorithms to each of the vectorized dynamic, control, cost, and observation matrices, each forecasting algorithm being associated with a set of prediction errors, and wherein the computer system further selects one of the set of forecasting algorithms that is associated with a first prediction error that is smaller than the others of the set of prediction errors.

14. The method of claim 10, wherein the control vector is generated such that an objective function is minimized.

15. The method of claim 10, wherein the control vector is generated by applying stabilization criteria to reduce fluctuations in revenue.

16. The method of claim 10, wherein the dynamic matrix is estimated based on an application of an analytical relationship between projected dynamic matrix values and measured historical values following from a dynamic equation with linear control and cost laws.

17. A logistics system for an enterprise having a resource allocation control system, the logistics system comprising:
  a data interface with a business system associated with one or more product lines;
  means for generating a control vector corresponding to a target allocation of resources between the plurality of products to be produced by the enterprise, the control vector being applied to adjust operation of the at least one production process for each of the products;
  means for obtaining data representing actual revenue generated by sales of each of the plurality of products in a market during a first time period;
  means for obtaining data representing actual cost attributed to each of the plurality of products during the first time period;
  means for producing an observation vector containing elements in a data structure representing actual retained earnings attributed to each of the plurality of products during the first time period, the actual retained earnings being based on the data representing the actual revenue and on the data representing the actual cost;
  means for generating, by the computing system, a dynamic matrix, a control matrix, a cost matrix, and an observation matrix, wherein:
  the dynamic matrix contains elements arranged in a data structure that represents a dynamic relationship between a current set of revenue values and a predicted set of revenue values at a second time period subsequent to the first time period;
  the control matrix contains elements arranged in a data structure that represents a dynamic relationship between the control vector and the actual revenue corresponding to each product depending on the control vector;
  the cost matrix contains elements arranged in a data structure that represents a dynamic relationship between variations in the market and actual revenue corresponding to each product depending on the variations in the market;
  the observation matrix contains elements arranged in a data structure that represents a dynamic relationship between the actual revenue corresponding to each product and the actual retained earnings;

means for revising the dynamic matrix, the control matrix, the cost matrix, and the observation matrix for the second time period to produce predicted values for each corresponding matrix, the predicted values being based on corresponding historical values from at least one prior time period, wherein a degree of accuracy of the predicted values and computational loading of the logistics system in implementing the means for revising the dynamic matrix, the control matrix, the cost matrix, and the observation matrix for the second time period increase with an increase in quantity of the at least one prior time period, and wherein the quantity of the at least one prior time period is limited in accordance with a desired level of accuracy of the predicted values.

18. The logistics system of claim 17, wherein the control vector is generated such that an objective function is minimized.

19. The logistics system of claim 17, wherein the control vector is generated by applying stabilization criteria to stabilize revenues for each of the products over a series of time periods.

20. The logistics system of claim 17, wherein the dynamic matrix is estimated based on an application of an analytical relationship between projected dynamic matrix values and measured historical values following from a dynamic equation with linear control and cost laws.

* * * * *